(12) United States Patent
Lee et al.

(10) Patent No.: US 9,991,914 B1
(45) Date of Patent: Jun. 5, 2018

(54) BI-DIRECTIONAL RADIO FREQUENCY FRONT-END (RFFE)

(71) Applicant: Amazon Technologies, Inc., Seattle, WA (US)

(72) Inventors: Tzung-I Lee, San Jose, CA (US); Omar Fawazhashim Zakaria, Santa Clara, CA (US); Cheol Su Kim, San Jose, CA (US); Varadarajan Gopalakrishnan, Cupertino, CA (US); In Chul Hyun, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/595,538

(22) Filed: May 15, 2017

(51) Int. Cl.
 *H04B 1/04* (2006.01)
 *H04W 52/52* (2009.01)
 *H04B 1/00* (2006.01)
 *H04W 72/04* (2009.01)
 *H04W 84/18* (2009.01)

(52) U.S. Cl.
 CPC ......... *H04B 1/0475* (2013.01); *H04B 1/0092* (2013.01); *H04W 52/52* (2013.01); *H04W 72/0453* (2013.01); *H04W 84/18* (2013.01)

(58) Field of Classification Search
 CPC ... H04B 1/0475; H04B 1/0092; H04W 52/52; H04W 72/0453

USPC ....................................................... 455/114.3
See application file for complete search history.

(56) References Cited

U.S. PATENT DOCUMENTS

| 8,219,059 | B2 * | 7/2012 | Pera | ..................... | H04B 1/1036 |
| | | | | | 455/266 |
| 2016/0218673 | A1 * | 7/2016 | Anderson | ................ | H03D 7/14 |

* cited by examiner

*Primary Examiner* — Sanh Phu
(74) *Attorney, Agent, or Firm* — Lowenstein Sandler LLP

(57) ABSTRACT

Technology for a bi-directional radio frequency front-end (RFFE) architecture with high selectivity performance is described. One RFFE has a first mixer that receives a LO signal from the LO circuit and a transmit (TX) signal, having a first frequency, from a transmitter and produces a down-converted TX signal for channel bandwidth filtering, the TX signal having a second frequency that is lower than the first frequency. A programmable filter circuit, in response to a selection signal, filters the down-converted TX signal according to a selected channel bandwidth. The second mixer receives the LO signal from the LO circuit and a channel-filtered TX signal from the programmable filter circuit and produces an up-converted TX signal having the first frequency. The power amplifier amplifies the up-converted TX signal to produce an output TX signal to cause an antenna to radiate electromagnetic energy in the selected channel bandwidth.

17 Claims, 15 Drawing Sheets

BI-DIRECTIONAL RADIO FREQUENCY FRONT-END (RFFE)

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
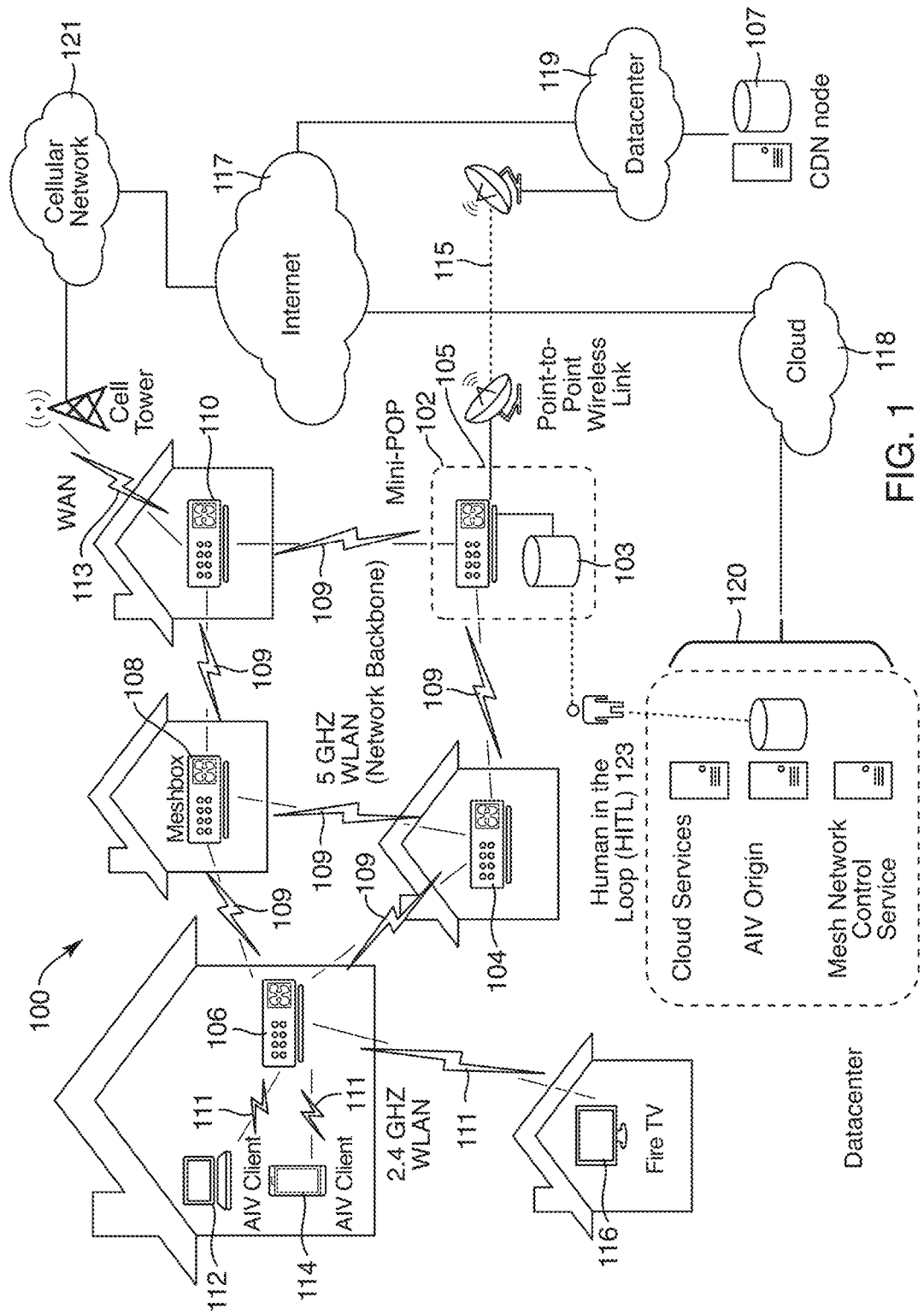
FIG. 1 is a network diagram of network hardware devices organized in a wireless mesh network (WMN) for content distribution to client devices in an environment of limited connectivity to broadband Internet infrastructure according to one embodiment.

Technology for a bi-directional radio frequency front-end (RFFE) architecture with high selectivity performance is described. One RFFE has a first mixer that receives a LO signal from the LO circuit and a transmit (TX) signal, having a first frequency, from a first port of a transmitter and produces a down-converted TX signal for channel bandwidth filtering, the TX signal having a second frequency that is lower than the first frequency. Mixers can be used to shift signals from one frequency range to another. A mixer can down-covert a signal from the first frequency to a second frequency that is lower than the first frequency. Similarly, the mixer can up-convert a signal from the second frequency to the first frequency that is higher than the second frequency. A programmable filter circuit, in response to a selection signal, filters the down-converted TX signal according to a selected channel bandwidth. The second mixer receives the LO signal from the LO circuit and a channel-filtered TX signal from the programmable filter and produces an up-converted TX signal having the first frequency. The power amplifier amplifies the up-converted TX signal to produce an output TX signal on a second port to cause an antenna to radiate electromagnetic energy in the selected channel bandwidth.

Also, described herein is a wireless mesh network (WMN) containing multiple mesh network devices, organized in a mesh topology, in which the RFFE architecture may be deployed. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN surfaces like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

Figure 13:
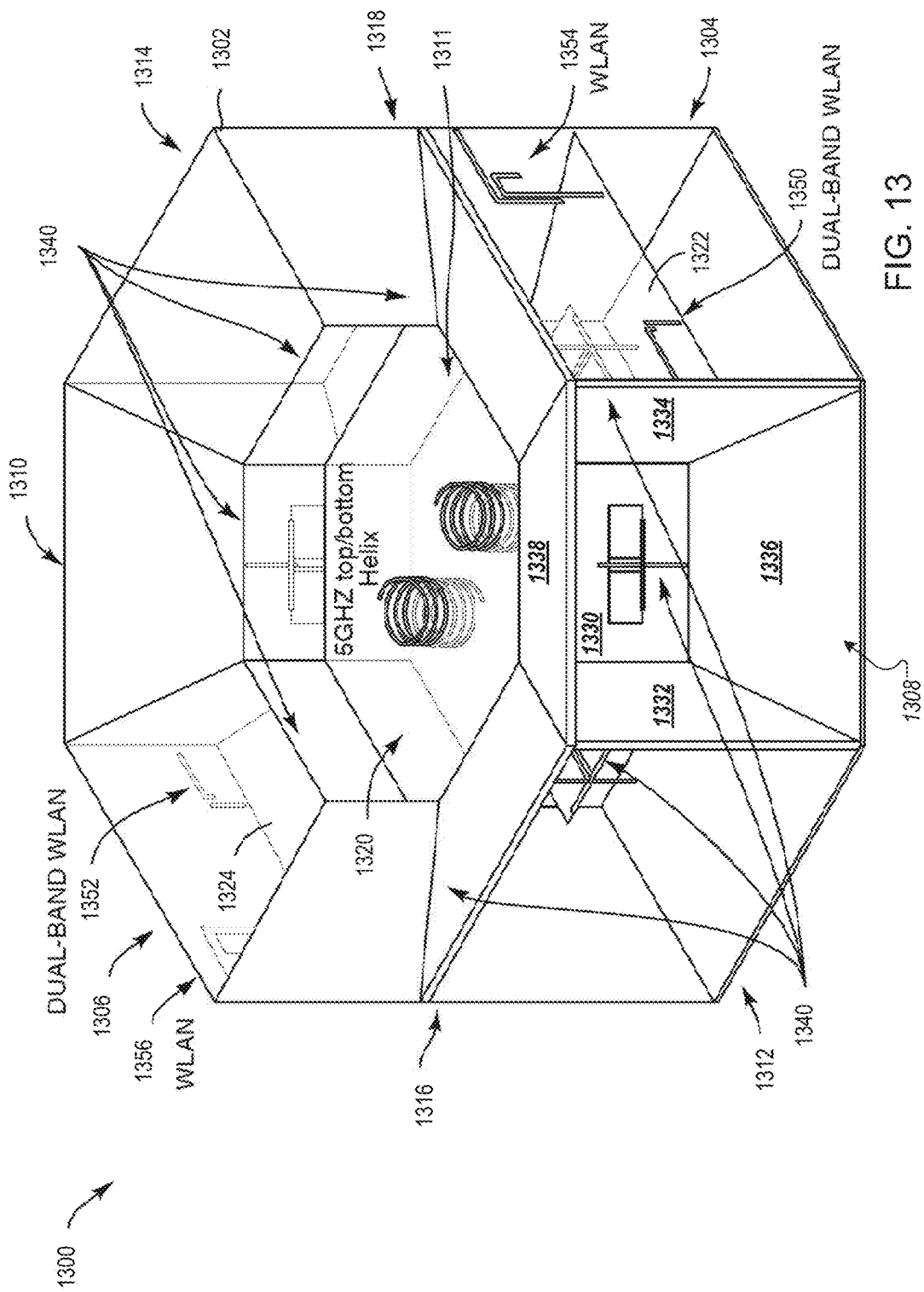
FIG. 13 illustrates a multi-radio, multi-channel (MRMC) network device according to one embodiment.
Figure 14:
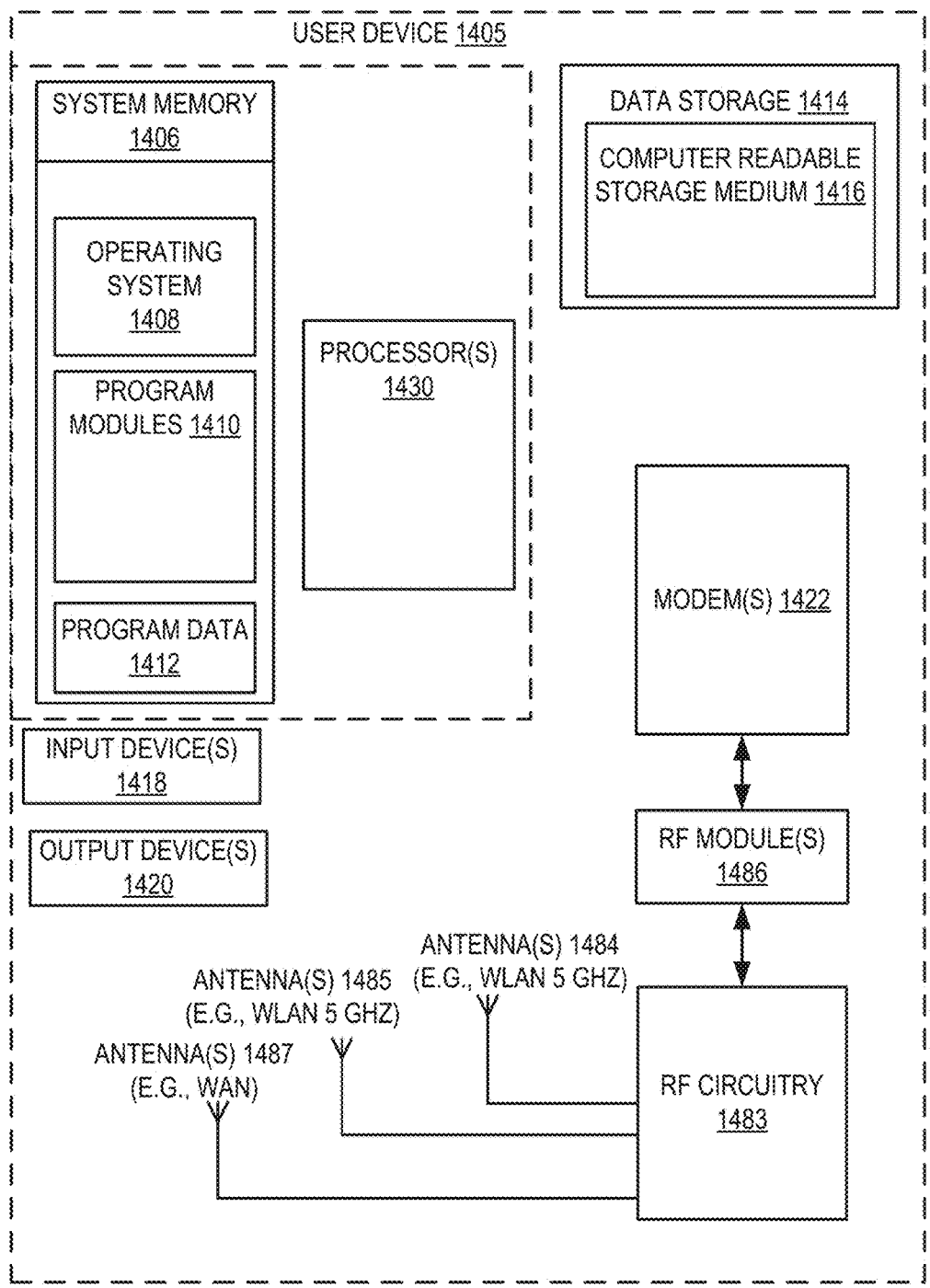
FIG. 14 is a block diagram of a network hardware device according to one embodiment.

FIGS. 1-4 are generally directed to network hardware devices, organized in a wireless mesh network, for content distribution to client consumption devices in environments of limited connectivity to broadband internet infrastructure. The embodiments described herein may be deployed in these network hardware devices. FIGS. 5-12 are generally directed to embodiments of the RFFE architecture with high selectivity performance. FIGS. 13-14-15 are generally directed to multi-radio, multi-channel (MRMC) mesh network devices that may implement various embodiments described herein.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
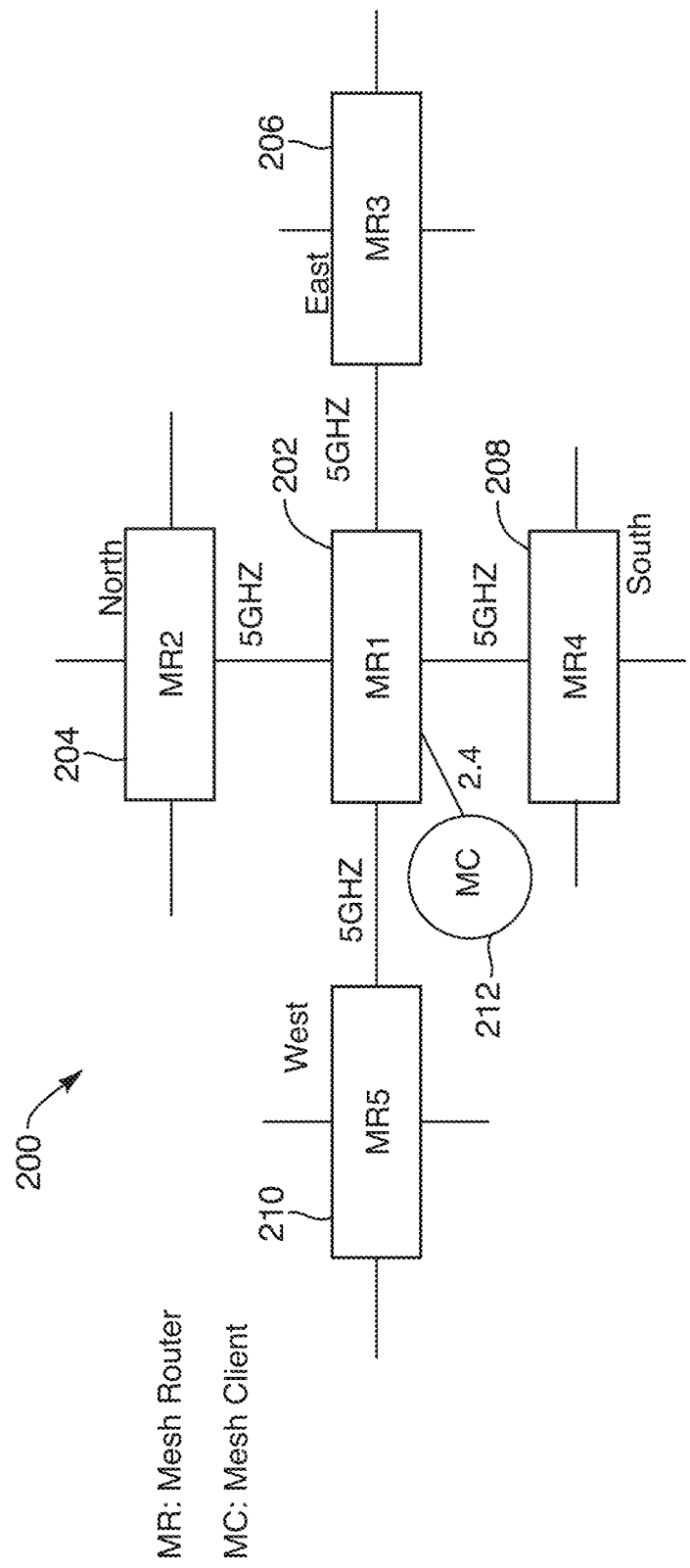
FIG. 2 is a block diagram of a network hardware device with five radios operating concurrently in a WMN according to one embodiment.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations that north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below. It should be noted that although the depicted embodiment illustrates and describes five mesh nodes, in other embodiments, more than five mesh nodes may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3:
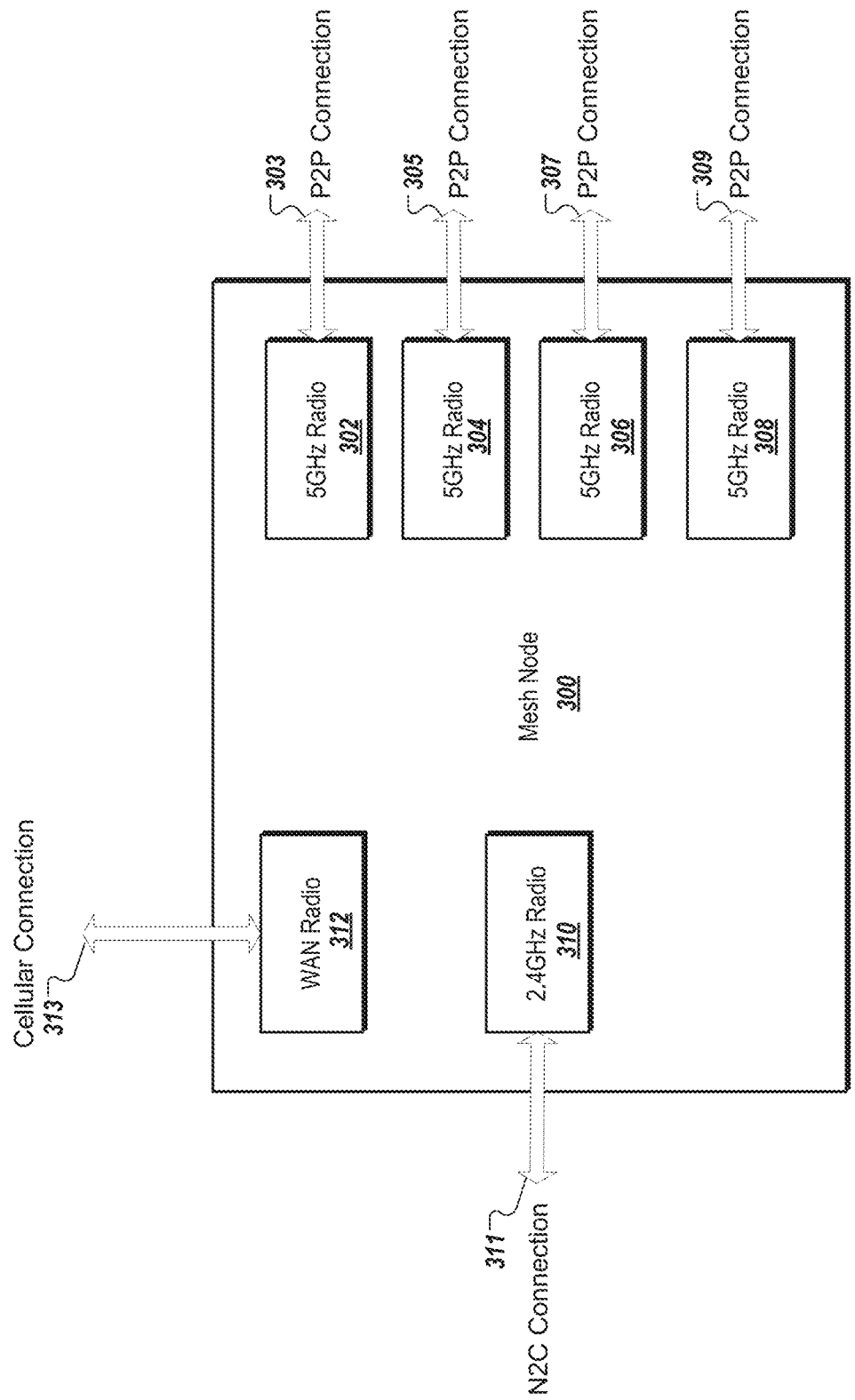
FIG. 3 is a block diagram of a mesh node with multiple radios according to one embodiment.
Figure 4:
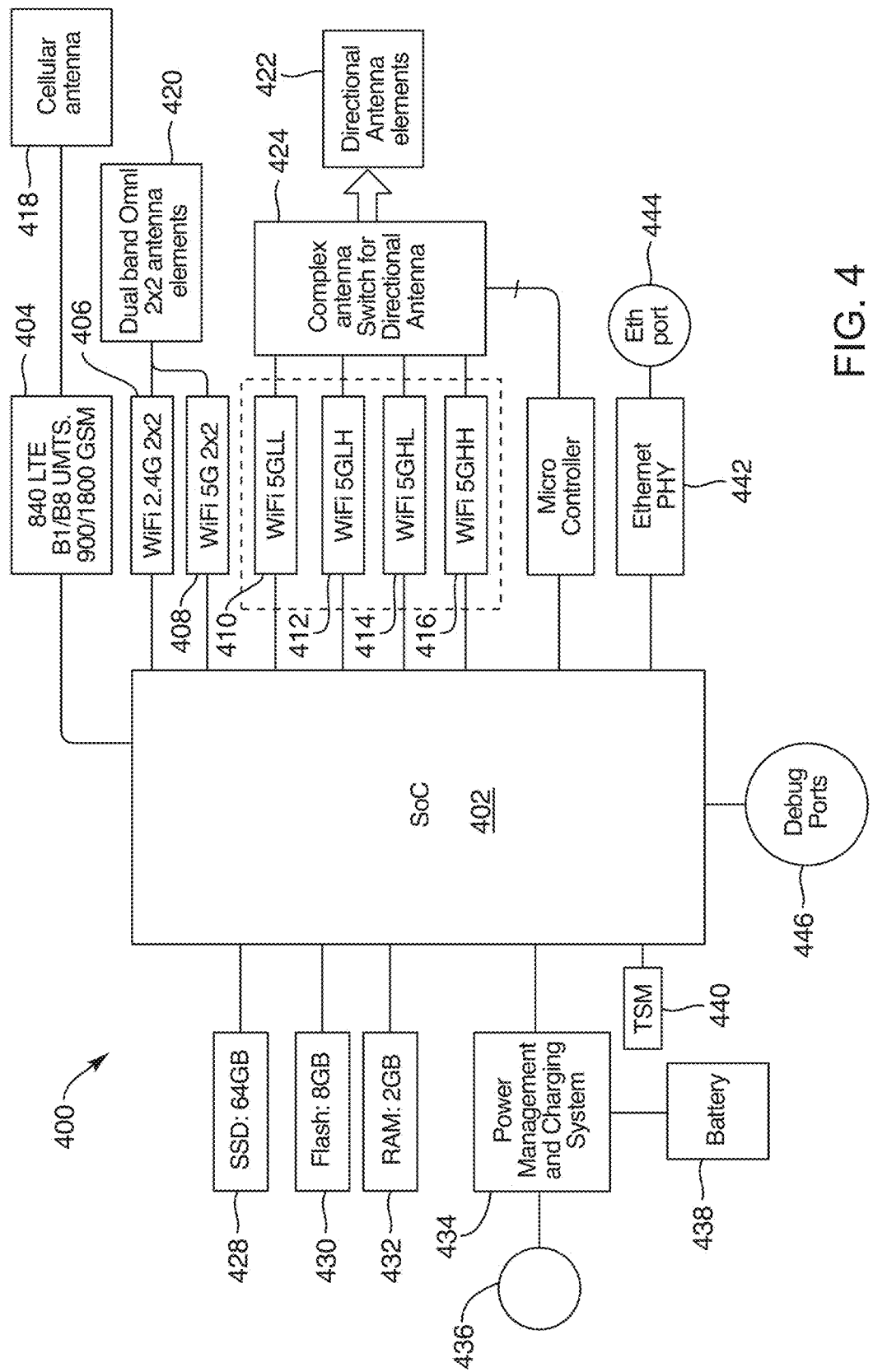
FIG. 4 is a block diagram of a mesh network device according to one embodiment.

FIG. 3 is a block diagram of a mesh node 300 with multiple radios according to one embodiment. The mesh node 300 includes a first 5 GHz radio 302, a second 5 GHz radio 304, a third 5 GHz radio 306, a fourth 5 GHz radio 308, a 2.4 GHz radio 310, and a cellular radio 312. The first 5 GHz radio 302 creates a first P2P wireless connection 303 between the mesh node 300 and another mesh node (not illustrated) in a WMN. The second 5 GHz radio 304 creates a second P2P wireless connection 305 between the mesh node 300 and another mesh node (not illustrated) in the WMN. The third 5 GHz radio 306 creates a third P2P wireless connection 307 between the mesh node 300 and another mesh node (not illustrated) in the WMN. The fourth 5 GHz radio 308 creates a fourth P2P wireless connection 309 between the mesh node 300 and another mesh node (not illustrated) in the WMN. The 2.4 GHz radio 310 creates a N2C wireless connection 311 between the mesh node 300 and a client consumption device (not illustrated) in the WMN. The cellular radio 312 creates a cellular connection between the mesh node 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-POP node that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In a further embodiment, the first network hardware device receive the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP node, as described herein. When the mini-POP node does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory or persistent storage of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP node is coupled to a storage device to store the content files as original content files for the wireless mesh network. A point-to-point wireless link may be established between the mini-POP node and a node of a CDN. In another embodiment, the mini-POP node is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receive the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices. The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP) node and a point-to-point wireless link is established between the mini-POP node and a POP node of an ISP. In one embodiment, the point-to-point wireless link is a microwave link (e.g., directional microwave link) between the mini-POP node and the node of the CDN. In another embodiment, the mini-POP node stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP node including a radio for inter-connection communications with at least one of the mesh nodes on a P2P channel. The mesh network architecture also includes a storage device coupled to the mini-POP, the storage device to store content files for distribution to a requesting client consumption device. The mini-POP node may be a single ingress point for content files for the self-contained mesh network. The storage devices of the mini-POP node may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and a mesh network control service (MNCS) device.

In one embodiment, the second radio can operate with 2×2 MIMO with maximum 40 MHz aggregation. This may result in per radio throughput of not more than 300 Mbps in 5 GHz and 150 Mbps in 2.4 GHz. Even with 5 radios (4×5 GHz and 1×2.4), the peak physical layer throughput will not need to be more than 1.4 Gbps. For example, a scaling factor of 1.4 may be used to arrive at a CPU frequency requirement. This implies the total processing clock speed in the CPU should not be less than 1.96 GHz (1.4×1.4=1.96 GHz). For example, the Indian ISM band has a requirement of 23 dBm EIRP. Since the WMN 100 needs to function under conditions where the mesh routers communicate with each other between homes, the propagation loss through multiple walls and over distances between homes, the link budget does not support sensitivity requirements for 802.11ac data rates. The per-node throughput may be limited to 300 Mbps per link—peak PHY rate. It should be noted that the scaling factor of 1.4 is just an example. In other cases, the scaling factor can be determined by a lot of factors, such as CPU architecture, number of cores, Wi-Fi® target offloading mode, NPU offload engine, software forwarding layers (L2 vs L3), or the like.

In another embodiment, a system includes a POP node having access to content files via at least one of data storage coupled to the POP node or a first point-to-point connection to a first device of an ISP. The system also includes multiple mesh nodes, organized in a WMN, and at least one of the mesh nodes is wirelessly coupled to the POP node. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

FIG. 4A is a block diagram of a mesh network device 400 according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. The mesh network device 400 may be the mini-POP node 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh node 300 of FIG. 3.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 400, such as for 10 minutes before the entire system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 404 may support other bands, as well as other cellular technologies. The mesh network device 400 may include a GPS antenna and corresponding GPS module to track the location of the mesh network device 400, such as moves between homes. However, the mesh network device 400 is intended to be located inside a structure, the GPS antenna and module may not be used in some embodiments.

The mesh network device 400 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 420 and the directional antennas 422 can be implemented within a fully switchable antenna architecture controlled by micro controller 426. For example, each 5 GHz radio can choose any 2 sectors (for 2 2×2 MU-MIMO streams).

The mesh network device 400 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422. The antenna switching circuitry 424 is described in more detail below with respect to FIGS. 5-7.

In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2×2 2.4 GHz MIMO radio 406 and a 2×2 5 GHz MIMO radio 408. The second set of WLAN modules includes a first 2×2 5 GHz MIMO radio 410 ("5GLL"), a second 2×2 5 GHz MIMO radio 412 ("5GLH"), a third 2×2 5 GHz MIMO radio 414 ("5GHL"), and a fourth 2×2 5 GHz MIMO radio 416 ("5GHH"). The dual-band omnidirectional antennas 420 may include a first omnidirectional antenna and a second omnidirectional antenna (not individually illustrated in FIG. 4). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

Figure 5:
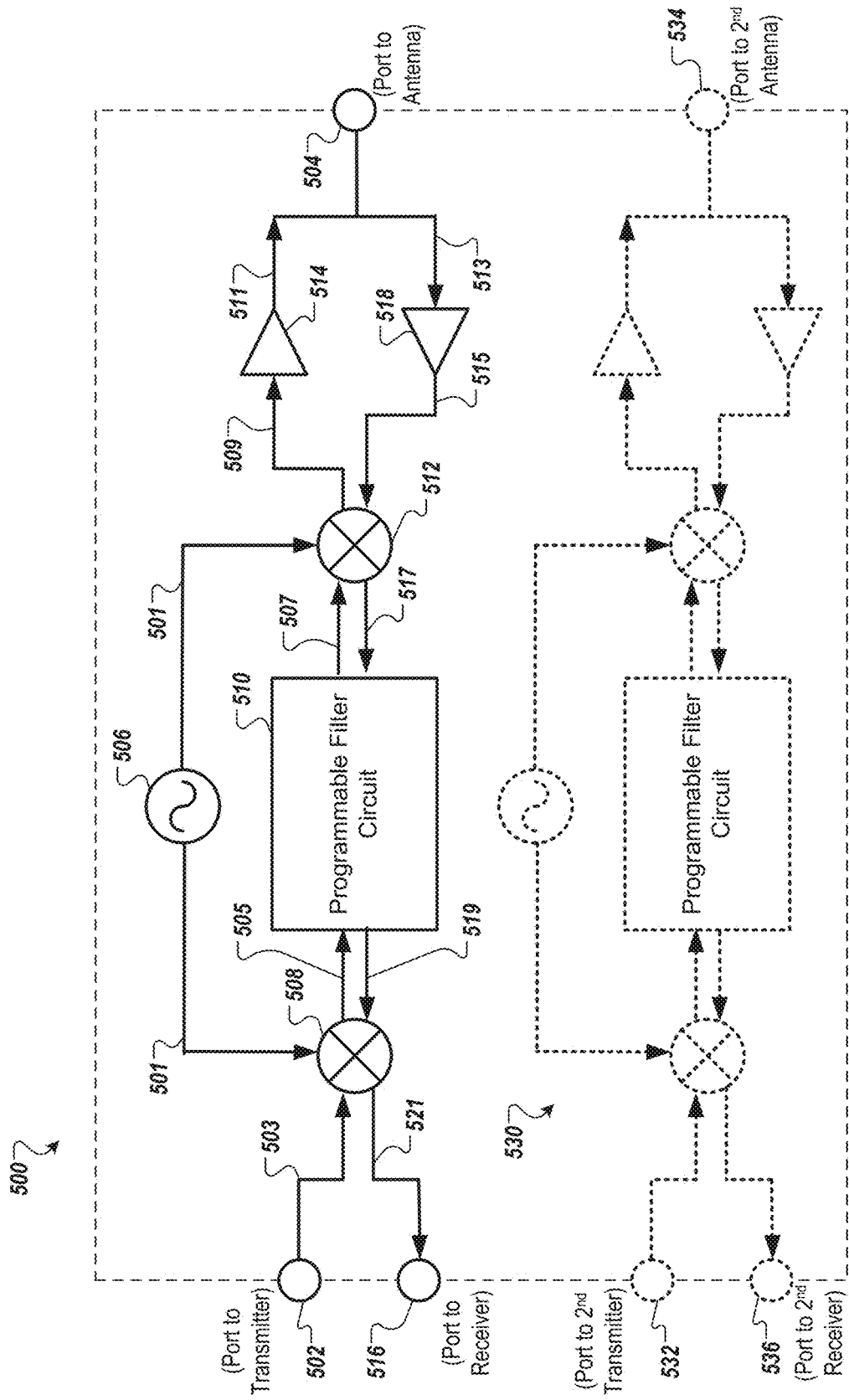
FIG. 5 is a block diagram of a RFFE circuit with a programmable filter circuit according to various embodiments.

In one embodiment, the antenna switching circuitry 424 includes multiple diplexers and switches to connect different combinations of antennas to the multiple radios. FIGS. 5-7 illustrate three different architectures for the antenna switching circuitry 424. The following diagrams use the following notations for reference:

ANT Hx→Horizontal orientation device side antenna
ANT Vx→Vertical orientation device side antenna
ANT VB→Vertical orientation device bottom side antenna
ANT HB→Horizontal orientation device bottom side antenna
ANT VU→Vertical orientation device top side antenna
ANT HU→Horizontal orientation device top side antenna
ANT0→Omni directional antenna
ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

Conventional 2.4 GHz WLAN radio architectures can only operate on a single channel while communicating to an access point (AP) or a client device (e.g., client consumption devices described herein). As a result, conventional solutions require spatially separated multiple APs. One conventional solution uses techniques to improve a receiver's adjacent channel interference (ACI) to address the impact from congested 2.4 GHz environment. However, this conventional solution supports only single channel operation in the 2.4 GHz band. FIGS. 5-12 are generally directed to embodiments of the RFFE architecture with high selectivity performance. This conventional solution does not address multi-radio operation in a single device and also does not address transmit out-of-channel noise (TXOON), which is a problem when multiple channels are concurrently operating on the same device. The embodiments described herein can be used to provide multi-radio operation in the 2.4 GHz band, the 5 GHz band, as well as other frequency bands. The embodiments described herein may also be used to improve co-existence in multi-protocol radio applications, such as Wi-Fi® and Zigbee® technologies, Wi-Fi® and Bluetooth® technologies, implemented in a single device. The embodiments described herein can be used to address TXOON caused by multi-radio operation in a single device, as described in more detail below. FIGS. 5-12 are generally directed to embodiments of the RFFE architecture with high selectivity performance.

FIG. 5 is a block diagram of a RFFE circuit 500 with a programmable filter circuit 510 according to various embodiments. In one embodiment, the RFFE circuit 500 includes a first port 502 configured to be coupled to a transmitter (not illustrated in FIG. 5) and a second port 504 configured to be coupled to an antenna (not illustrated in FIG. 5). The RFFE circuit 500 also includes a local oscillator (LO) circuit 506 configured to generate a LO signal 501. The LO circuit 506 may be a voltage controlled oscillator (VCO), a phase locked loop (PLL) synthesizer, or other types of frequency synthesizers or oscillators. Alternatively, other LO circuits may be used. The RFFE circuit 500 includes a first mixer 508 coupled to the LO circuit 506 and the first port 502. The first mixer 508 can be configured to receive the LO signal 501 from the LO circuit 506 and a transmit (TX) signal 503, having a first frequency, from the first port 502. The first mixer 508 (also referred to as a frequency mixer, an up/down mixer) can be an electrical circuit that creates a new signal from two input signals. Mixers can be used to shift signals from one frequency range to another. In this embodiment, the first mixer 508 down converts the TX signals, but as described below, can up convert RX signals. In the depicted embodiment, the first mixer 508 produces a down-converted TX signal 505 for channel bandwidth filtering. The TX signal 503 has a second frequency that is lower than the first frequency. The RFFE circuit 500 includes a programmable filter circuit 510 coupled to the first mixer 508. The programmable filter circuit 510 can receive a selection signal (not illustrated in FIG. 5), and in response to the selection signal, filter the down-converted TX signal 505, according to a selected channel bandwidth per the selection signal, to produce a channel-filtered TX signal 507 corresponding to the selected channel bandwidth. The selected channel bandwidth may be one of multiple channel bandwidths in a single frequency band (e.g., four channel bandwidths for the WLAN frequency band, such as 2.4 GHz band). The RFFE circuit 500 includes a second mixer 512 that is coupled to the LO circuit 506 and the programmable filter circuit 510. The second mixer 512 is configured to receive the LO signal 501 from the LO circuit 506 and the channel-filtered TX signal 507 from the programmable filter circuit 510 and produce an up-converted TX signal 509 having the first frequency. The RFFE circuit 500 includes a power amplifier 514 that is coupled to the second mixer 512. The power amplifier 514 is configured to amplify the up-converted TX signal 509 to produce an output TX signal 511 on the second port 504. The output TX signal 511 causes the antenna to radiate electromagnetic energy in the selected channel bandwidth.

In a further embodiment, the RFFE circuit 500 also includes a third port 516 configured to be coupled to a receiver (not illustrated in FIG. 5) and a low-noise amplifier (LNA) 518 coupled to the second port 504. The LNA 518 is configured to receive a RX signal 513 having a third frequency in the frequency band from the second port 504, via the antenna. The LNA 518 amplifies the RX signal 513 to produce a filtered RX signal 515. The second mixer 512 is coupled to the LNA 518 and is further configured to receive the LO signal 501 and the filtered RX signal 515 and produce a down-converted RX signal 517 for channel bandwidth filtering by the programmable filter circuit 510. The down-converted RX signal 517 has a fourth frequency that is lower than the third frequency. The programmable filter circuit 510, in response to a second selection signal, is configured to filter the down-converted RX signal 517 according to a second selected channel bandwidth to produce a channel-filtered RX signal 519 corresponding to the second selected channel bandwidth. The first mixer 508 is further configured to receive the LO signal 501 and the channel-filtered RX signal 519 to produce an up-converted RX signal 521 on the third port. The up-converted RX signal 521 has the third frequency.

In one embodiment, the first port 502 is coupled to a first port 502 of a radio and the third port 516 is coupled to a second port of the radio. The radio may include both the transmitter and the receiver. In one embodiment, the RFFE circuit 500 is a first integrated circuit and the radio is a second integrated circuit that is different than the first integrated circuit. Alternatively, the RFFE circuit 500 may be integrated with the radio, a processing device, or other circuitry of an electronic device. In one embodiment, the RFFE circuit 500 is part of the SoC 402 of FIG. 4. Alternatively, the RFFE circuit 500 is part of the antenna switching circuitry 424 of FIG. 4, part of the microcontroller of FIG. 4, or part of other components of the mesh network device 400 of FIG. 4. Alternatively, the RFFE circuit 500 can be implemented in other electronic devices than the mesh network devices described herein.

In another embodiment, as illustrated in dashed lines of FIG. 5, the RFFE circuit 500 further includes a fourth port 532 configured to be coupled to a second transmitter (not illustrated in FIG. 5), a fifth port 534 configured to be coupled to a second antenna not illustrated in FIG. 5), a sixth port 536 configured to be coupled to a second receiver not illustrated in FIG. 5), a duplicate circuit 530 coupled the fourth port 532, the fifth port 534, and the sixth port 536. The duplicate circuit 530 can include the same components as those described above, for example, including a second LO circuit, a third mixer, a second programmable filter circuit, a fourth mixer, a second power amplifier, and a second LNA. The second transmitter and the second receiver may be integrated into a same second radio, whereas the transmitter and receiver coupled to the ports 502, 516, respectively are integrated into a same first radio. The two radios can be implemented in a single integrated circuit or multiple integrated circuits. For example, the RFFE circuit 500 is a first integrated circuit, the first radio is a second integrated circuit that is different than the first integrated circuit, and the second radio is a third integrated circuit that is different than the first integrated circuit and the second integrated circuit. The RFFE circuit 500 may also be implemented in more than one integrated circuit.

In one embodiment, the second LO circuit is configured to generate a second LO signal. The frequency of the second LO signal can be the same or different than the frequency of the LO signal described above with respect to the first radio and first antenna. The third mixer is configured to receive the second LO signal from the second LO circuit and a second TX signal from the fourth port 532 and produce a second down-converted TX signal for channel bandwidth filtering by the second programmable filter circuit. The second TX signal has a sixth frequency. The sixth frequency can be the same or different than the second frequency described above with respect to the first radio and first antenna. The second programmable filter circuit, in response to a third selection signal, is configured to filter the second down-converted TX signal according to a third selected channel bandwidth to produce a second channel-filtered TX signal corresponding to the third selected channel bandwidth. The fourth mixer is configured to receive the second LO signal from the second LO circuit and the second channel-filtered TX signal from the second programmable filter circuit and produce a second up-converted TX signal having the fifth frequency. The second power amplifier is configured to amplify the second up-converted TX signal to produce a second output TX signal on the fifth port 534. The second output TX signal causes a second antenna to radiate electromagnetic energy in the third selected channel bandwidth.

In a further embodiment, the second LNA is configured to filter a second RX signal having a seventh frequency, received via the second antenna, to produce a second filtered RX signal. The seventh frequency may be the same or different frequency as the third frequency described above with respect to the first radio and the first antenna. The fourth mixer is further configured to receive the second LO signal and the second filtered RX signal and produce a second down-converted RX signal for channel bandwidth filtering by the second programmable filter circuit. The second down-converted RX signal has an eighth frequency that is lower than the third frequency. The eighth frequency can be the same or different than the fourth frequency described above with respect to the first radio and first antenna. The second programmable filter circuit, in response to a fourth selection signal, is configured to filter the second down-converted RX signal according to a fourth selected channel bandwidth to produce a second channel-filtered RX signal corresponding to the fourth selected channel bandwidth. The third mixer is further configured to receive the second LO signal and the second channel-filtered RX signal to produce a second up-converted RX signal on the sixth port 536. The second up-converted RX signal has the third frequency.

Figure 6A:
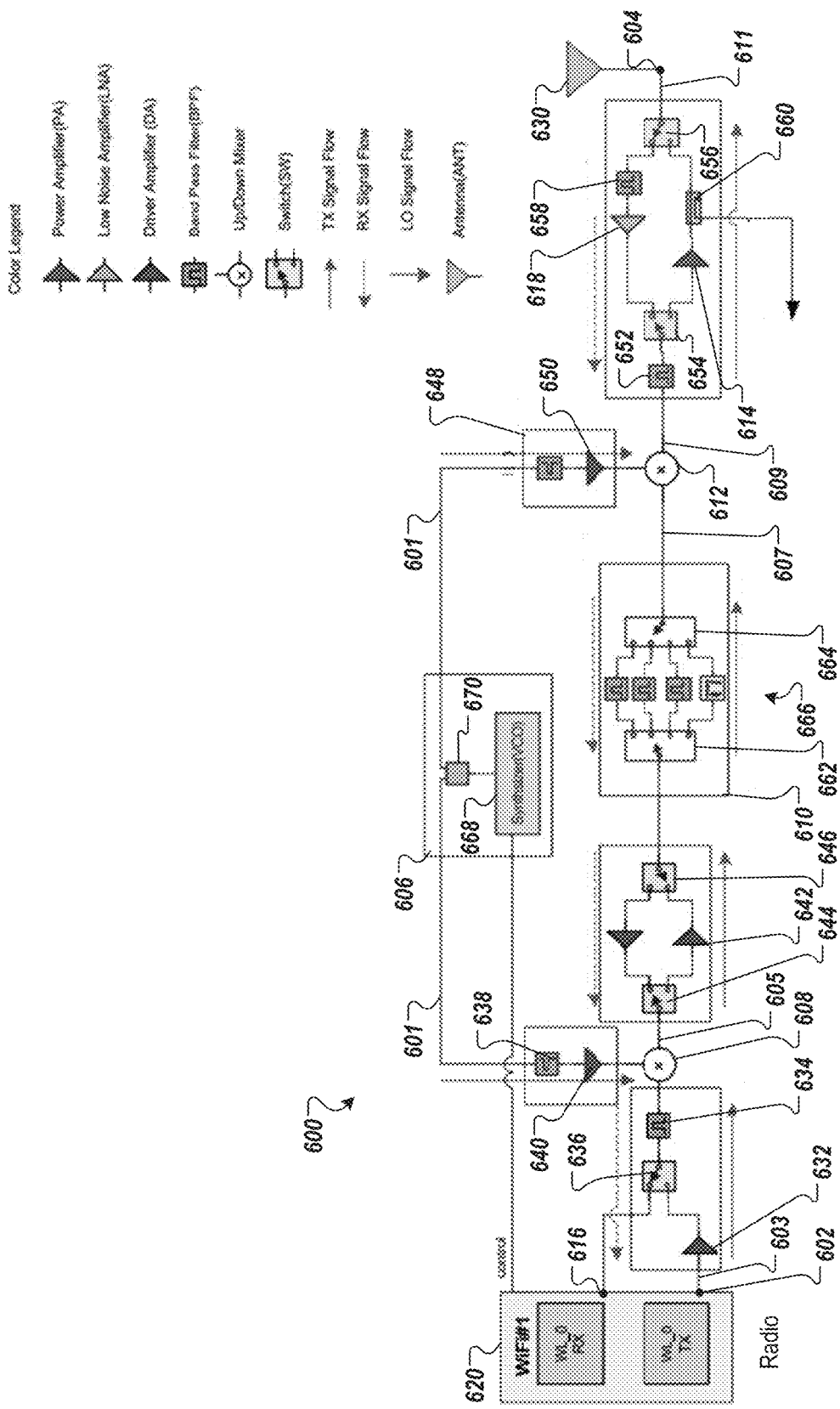
FIG. 6A is a block diagram of a transmit (TX) path within RFFE circuitry with high selectivity performance in multi-channel operation according to one embodiment.
Figure 6B:
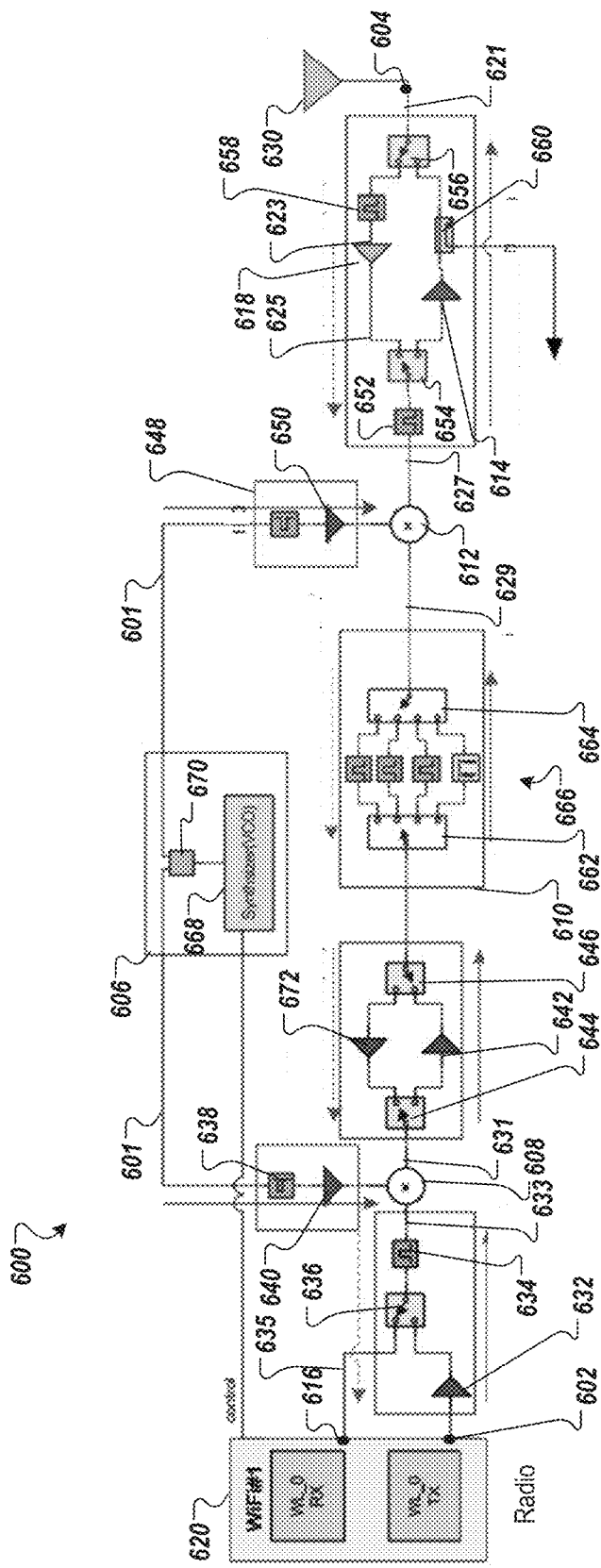
FIG. 6B is a block diagram of a receive (RX) path within the RFFE circuitry of FIG. 6A according to one embodiment.
Figure 7:
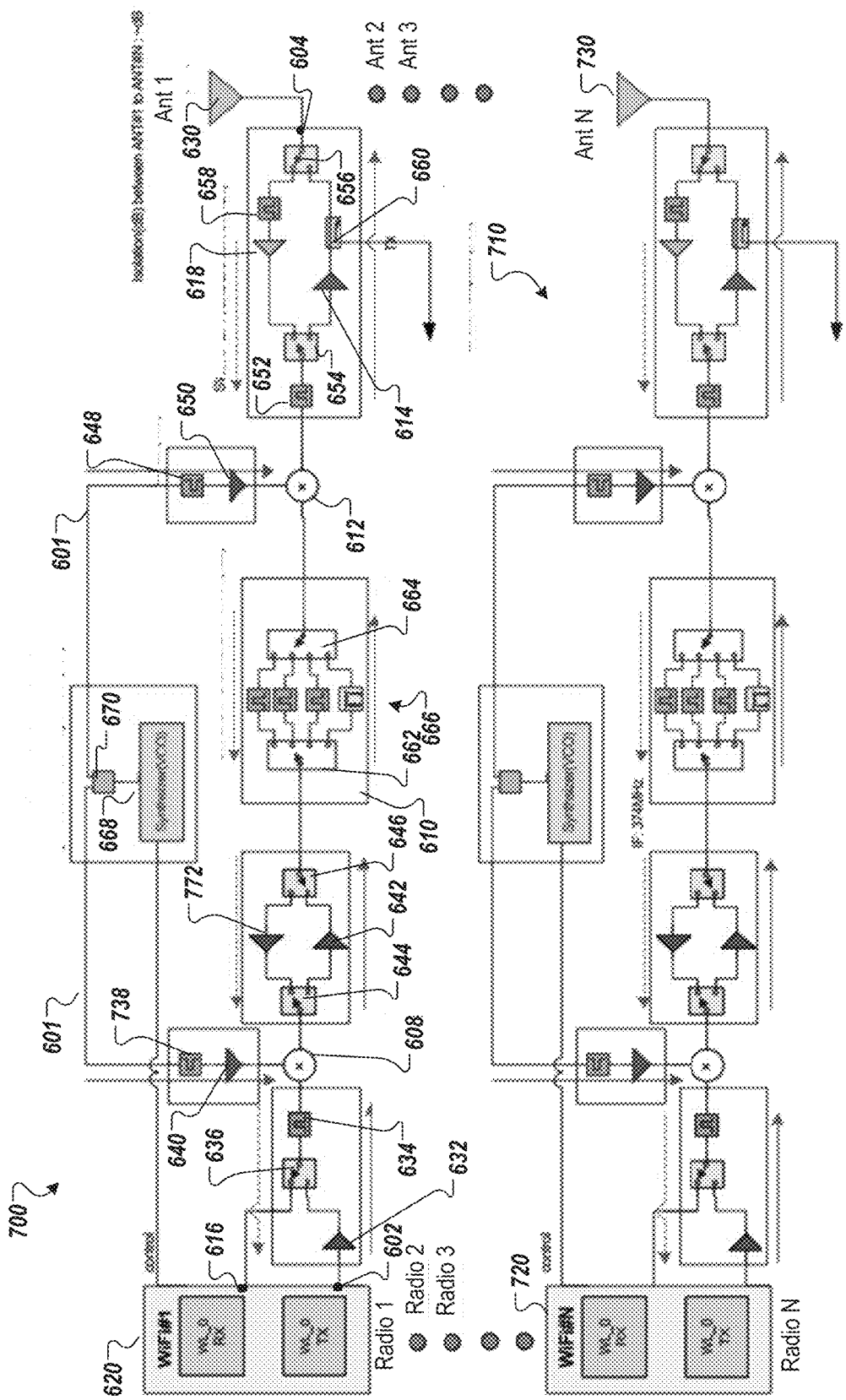
FIG. 7 is a block diagram of RFFE circuitry with high selectivity performance in multi-channel operation with multiple radios and multiple antennas according to one embodiment.

In one embodiment, as illustrated in FIGS. 6A, 6B, and 7, the programmable filter circuit 510 includes a first multi-port switch coupled to the first mixer 508 and a second multi-port switch coupled to the second mixer 512. The first multi-port switch is configured to receive the down-converted TX signal from the first mixer and the selection signal. The second multi-port switch is configured to receive the channel-filtered TX signal from the programmable filter circuit 510 and the selection signal. The programmable filter circuit 510 also includes a first channel band pass filter (BPF) disposed along a first channel path between the first multi-port switch and the second multi-port switch and a second channel BPF disposed along a second channel path between the first multi-port switch and the second multi-port switch. The first channel BPF is configured to filter the down-converted TX signal according to a first channel bandwidth to produce the channel-filtered TX signal corresponding to the selected channel bandwidth. The second channel BPF is configured to filter the down-converted TX signal according to a second channel bandwidth to produce the channel-filtered TX signal corresponding to the selected channel bandwidth. In a further embodiment, the programmable filter circuit 510 further includes a third channel BPF disposed along a third channel path between the first multi-port switch and the second multi-port switch and a fourth channel BPF disposed along a fourth channel between the first multi-port switch and the second multi-port switch. The third channel BPF is configured to filter the down-converted TX signal according to a third channel bandwidth to produce the channel-filtered TX signal corresponding to the selected channel bandwidth. The fourth channel BPF is configured to filter the down-converted TX signal according to a fourth channel bandwidth to produce the channel-filtered TX signal corresponding to the selected channel bandwidth.

The RFFE circuit 500 can be implemented using various circuit configurations, such as illustrated and described below with respect to FIGS. 6A, 6B, and 7.

FIG. 6A is a block diagram of a transmit (TX) path within RFFE circuitry 600 with high selectivity performance in multi-channel operation according to one embodiment. The RFFE circuitry 600 includes a first port 602 coupled to a transmitter of radio 620, a second port 604 coupled to a first antenna 630, and a third port 616 coupled to a receiver of the radio 620. In one embodiment, the radio 620 is a WLAN radio, such as a radio implementing the Wi-Fi® technology in the 2.4 GHz band, the 5 GHz band, or any combination thereof. The radio 620 may also be other types of radios, such as wireless PAN radios, cellular radios, or the like. The RFFE circuitry 600 also includes similar components as the RFFE circuit 500 of FIG. 5, as noted by similar reference numbers. For example, the RFFE circuitry 600 includes a LO circuit 606, a first mixer 608, a programmable filter circuit 610, a second mixer 612, a power amplifier 614, and a LNA 618 that operate in a similar fashion as described above with respect to FIG. 5. The RFFE circuitry 600 includes additional components as described in more detail below.

In the depicted embodiment, the RFFE circuitry 600 includes a first driver amplifier (DA) 632 coupled to the first port 602 and a first BPF 634 coupled to the first DA 632 and the first mixer 608. The first DA 632 amplifies a TX signal 603 received from the first port 602 (also referred to as a transmitter port) to produce an amplified TX signal. The transmit TX signal 603 has a RF frequency within a first frequency range. The first BPF 634 filters the amplified TX signal to produce a filtered TX signal that is input into the first mixer 608. The first DA 632 and the first BPF 634 can be implemented in a block circuit with a first switch 636 to accommodate a TX path from the transmitter and a RX path to the receiver. The RX path is described below with respect to FIG. 6B.

The RFFE circuitry 600 also includes a second BPF 638 coupled to the LO circuit 606 and a second DA 640 coupled to the second BPF and the first mixer 608. The second BPF 638 filters the LO signal 601 to produce a filtered LO signal. The second DA amplifies the filtered LO signal to produce an amplified LO signal that is input into the first mixer 608. The first mixer 608 receives the amplified LO signal and the filtered TX signal to produce an intermediate frequency (IF) TX signal 605 (down-converted TX signal 605) with an intermediate frequency (IF) that is lower than the first frequency of the TX signal 603.

The RFFE circuitry 600 also includes a third DA 642 that is coupled to the first mixer 608. The third DA 642 can be implemented in a block circuit with a second switch 644 and a third switch 646 to accommodate the TX path and the RX path to the receiver. The RX path may include a DA as well as is described below with respect to FIG. 6B.

The RFFE circuitry 600 also includes a third BPF 648 that is coupled to the LO circuit 606 and a fourth DA 650 that is coupled to the third BPF 648 and the second mixer 612. The third BPF 648 filters the LO signal 601 to produce a second filtered LO signal and the fourth DA 650 amplifies the second filtered LO signal to produce a second amplified LO signal that is input into the second mixer 612. The second mixer 612 receives the second amplified LO signal and a second signal 607 that is one of the four filtered IF TX signals as described below (also referred to as the channel-filtered TX signal 607). The second mixer 612 produces an up-converted TX signal 609 having the RF frequency.

The RFFE circuitry 600 also includes a fourth BPF 652 coupled to the second mixer 612 and the power amplifier 614. The fourth BPF 652 filters the up-converted TX signal 609 to produce a filtered, up-converted TX signal. The power amplifier 614 amplifies the filtered, up-converted TX signal to produce an output TX signal 611. The output TX signal 611 causes the antenna 630 to radiate electromagnetic energy in the first frequency range. The fourth BPF 652 can be implemented in a block circuit with a fourth switch 654 and a fifth switch 656 to accommodate the TX path and the RX path. The RX path may include a LNA 618 and a fifth BPF 658, which are described below with respect to FIG. 6B. In another embodiment, a power detector 660 is coupled to the power amplifier 614 and feeds back to the radios 620 the power detected. In one embodiment, the power detector 660 is a RF coupler. Alternatively, other circuits could be used to detect and report the power of the output TX signal 611.

In the depicted embodiment, the programmable filter circuit 610 includes a first multi-port switch 662 coupled to the third DA 642, via the third switch 646, and a second multi-port switch 664 coupled to the second mixer 612. The first multi-port switch 662 is configured to receive the down-converted TX signal 605 from the first mixer 608. The first multi-port switch 662 also receives a selection signal (not illustrated in FIG. 6A). The selection signal may be received from the radio 620. Alternatively, the selection signal may be received from another component, such as the SoC, the antenna switching circuitry, or the microcontroller, as described herein. The programmable filter circuit 610 also includes multiple channel BPFs 666. In the depicted embodiment, the programmable filter circuit 610 includes four channel BPFs 666, including a first channel BPF disposed along a first channel path between the first multi-port switch 662 and the second multi-port switch 664; a second channel BPF disposed along a second channel path between the second multi-port switch and the second multi-port switch; a third channel BPF disposed along a third channel path between the first multi-port switch and the second multi-port switch; and a fourth channel BPF disposed along a fourth channel path between the second multi-port switch and the second multi-port switch. The first channel BPF is configured to filter the down-converted TX signal 605 according to a first channel bandwidth (e.g., 40 MHz) to produce the channel-filtered TX signal 607 corresponding to the selected channel bandwidth. The second channel BPF is configured to filter the down-converted TX signal 605 according to a second channel bandwidth (e.g., 80 MHz) to produce the channel-filtered TX signal 607 corresponding to the selected channel bandwidth. The third channel BPF is configured to filter the down-converted TX signal 605 according to a third channel bandwidth to produce the channel-filtered TX signal 607 corresponding to the selected channel bandwidth. The fourth channel BPF is configured to filter the down-converted TX signal 605 according to a fourth channel bandwidth to produce the channel-filtered TX signal 607 corresponding to the selected channel bandwidth.

In the depicted embodiment, the LO circuit 606 includes a frequency synthesizer 668 and a 2-way divider 670. The frequency synthesizer 668 can be a voltage controlled oscillator (VCO) and can receive a control signal 669 from the radio 620. In one embodiment, the radio 620 operates in the 2.4 GHz band and the frequency synthesizer 668 can generate the LO signal 601 with the second frequency that is within a frequency range between approximately 2038 MHz and 2098 MHz. In one implementation, the second frequency is 2063 MHz. The 2-way divider 670 can create two copies of the LO signal 601, a first copy of the LO signal 601 being fed to the first mixer 608 and a second copy of the LO signal 601 being fed to the second mixer 612. Alternatively, the LO circuit 606 may be other types of local oscillators.

In one embodiment, the radio 620 is a WLAN radio that operates at 2.4 GHz for wireless communications using any one of the WLAN protocols, such as 802.11n. The WLAN radio includes a zero intermediate frequency (ZIF) transceiver that transmits a RF signal using channel 6, according to any one of the wireless protocols, such as the 802.11a/b/g/n/ac Wi-Fi® standards. ZIF architecture is also referred to as direct conversion architecture (DCR). DCR or ZIF architectures can be used because of its simplicity and low cost. Most ZIF transmitters/transceivers do not have inter-stage filters. Because of less filtering, the linearity requirement for a direct conversion receiver is important as it is more sensitive than super-heterodyne architectures. In full duplex division, a strong TX signal can create unwanted input at a LNA of a receiver, causing non-linearity. This is also referred to as TX blocking. In this example, the RF signal may have a center frequency of 2436 MHz. The RFFE circuitry may include a driver amplifier, two-way switch, and an RF band pass filter may be coupled to a transmitter port of the WLAN radio, a down-converter mixer is connected to the filter output and converts the RF signal to an intermediate frequency (IF) TX signal (e.g., 374 MHz). The IF TX signal is passed to a switch and a driver amplifier. A synthesizer is used to generate a desired LO signal. The LO frequency range, for example, may be approximately 2038 MHz to 2098 MHz. The LO signal passes through an LO band pass filter and a driver amplifier and is fed into the down-converter mixer. The down-converter mixer produces an IF TX signal with the designed intermediate frequency. The IF signal is amplified by an IF driver amplifier and connected to a 4-port switch, which selects and routes the IF signal to the selected IF channel BPF. For example, the RFFE can include several different channel filters, for example, a channel filter for 20 MHz, a channel filter for 40 MHz, a channel filter for 80 MHz, respectively. This different channel filters can be used to accommodate different channel bandwidth configurations defined by the protocol. The IF filtered IF signal is passed to an up-converter mixer that up-converts the signal to the original RF frequency. A similar stage of LO, DA, and filter is used to feed the LO signal to the up-converter mixer, as done for the down-converter mixer. The up-converted TX signal is fed to an RF band pass filter, switch, and power amplifier. The TX signal is passed to the antenna for over the air transmission.

In another embodiment, an electronic device includes a first antenna, a first zero ZIF transceiver including a transmitter port; and RFFE circuitry coupled to the first ZIF transceiver and the first antenna. The RFFE circuitry includes a first DA coupled to the transmitter port and a frequency synthesizer generates a LO signal. The first DA amplifies a TX signal received from the transmitter port to produce an amplified TX signal having a RF frequency within a first frequency range. A first BPF is coupled to the first DA and the first BPF filters the amplified TX signal to produce a filtered TX signal. A first mixer is coupled to the first BPF and a second BPF is coupled to the frequency synthesizer. The second BPF filters the LO signal to produce a filtered LO signal. A second DA is coupled to the second BPF and the first mixer. The second DA amplifies the filtered LO signal to produce an amplified LO signal. The first mixer receives the amplified LO signal and the filtered TX signal to produce an IF TX signal with an intermediate frequency (e.g., 374 MHz). The intermediate frequency may be lower than the RF frequency. A third DA is coupled to the first mixer and the third DA amplifies the IF TX signal to produce an amplified IF TX signal. The RFFE includes a first multi-port switch that is coupled to the third DA, a second multi-port switch, a first channel BPF and a second channel BPF. The first channel BPF is coupled between a first port of the first multi-port switch and a first port of the second multi-port switch on a first channel path. The second channel BPF is coupled between a second port of the first multi-port-switch and a second port of the second multi-port switch. The first channel BPF filters the amplified IF TX signal to produce a first filtered IF TX signal when the first port of the first multi-port switch and the first port of the second multi-port switch are selected for a first channel bandwidth of the first frequency range. The second channel BPF filters the amplified IF TX signal to produce a second filtered IF TX signal when the second port of the first multi-port switch and the second port of the second multi-port switch are selected for a second channel bandwidth of the first frequency range. A third BPF is coupled to the frequency synthesizer and the third BPF filters the LO signal to produce a second filtered LO signal. A fourth DA is coupled to the third BPF and the fourth DA amplifies the second filtered LO signal to produce a second amplified LO signal that is fed into the second mixer. The second mixer receives the second amplified LO signal and either the first filtered IF TX signal or the second filtered IF TX signal to produce an up-converted TX signal with the RF frequency. A fourth BPF is coupled to the second mixer and the fourth BPF filters the up-converted TX signal to produce a filtered, up-converted TX signal. A power amplifier is coupled to the fourth BPF and the first antenna. The power amplifier amplifies the filtered, up-converted TX signal to produce an output TX signal to cause the first antenna to radiate electromagnetic energy with either a selected one of the first channel bandwidth or the second channel bandwidth.

In another embodiment, the ZIF transceiver also includes a receiver and the RFFE is coupled to a receiver port. The RFFE circuitry further includes a first switch coupled to the receiver port, the transmitter port, and the first BPF. The first DA is coupled between the transmitter port and the first switch. The RFFE circuit also includes a fifth DA, a second switch coupled to the first mixer and a third switch coupled to the first multi-port switch. The third DA is disposed along a TX path between the second switch and the third switch and the fifth DA is disposed along a RX path between the second switch and the third switch. A LNA is coupled to the fifth BPF and the fifth BPF filters a RX signal received by the first antenna to produce a filtered RX signal. The LNA amplifies the filtered RX signal to produce an amplified RX signal. The RFFE circuit further includes a fourth switch coupled to the fourth BPF and a fifth switch coupled to the antenna. The LNA and the fifth BPF are disposed along a TX path between the fourth switch and the fifth switch and the power amplifier is disposed along a RX path between the fourth switch and the fifth switch. The fourth BPF filters the amplified RX signal to produce a filtered RX signal. The second mixer receives the second amplified LO signal and the filtered RX signal to produce an IF RX signal with the intermediate frequency. The first channel BPF filters the IF RX signal to produce a first filtered IF RX signal when the first channel path is selected and the second channel BPF filters the IF RX signal to produce a second filtered IF RX signal when the second channel path is selected. The fifth DA amplifies either the first filtered IF RX signal or the second filtered IF RX signal to produce an amplified IF RX signal. The first mixer receives the amplified LO signal and the amplified IF RX signal to produce an up-converted TX signal with the RF frequency. The first BPF filters the up-converted TX signal to produce an input RX signal for the receiver port.

In a further embodiment, the RFFE circuitry further includes a third channel BPF and a fourth channel BPF. The third BPF is coupled between a third port of the first multi-port switch and a third port of the second multi-port switch in a third channel path and the fourth channel BPF is coupled between a fourth port of the first multi-port switch and a fourth port of the second multi-port switch in a fourth channel path.

FIG. 6B is a block diagram of a receive (RX) path within the RFFE circuitry 600 of FIG. 6A according to one embodiment. The RFFE circuitry 600 includes the components described above with respect to FIG. 6A, as well as some additional components described herein. The RFFE circuitry 600 further includes a third port 616 coupled to a receiver of the radio 620. A first switch 636 is coupled to the first port 502, the third port 616, and the first BPF 634. The first DA 632 is coupled between the first port 502 and the first switch 636. The RFFE circuitry 600 further includes a second switch 644 coupled to the first mixer 508 and a third switch 646 coupled to the programmable filter circuit 610. The third DA 642 is disposed along a TX path between the second switch 644 and the third switch 646. A fifth DA 672 is disposed along a RX path between the second switch 644 and the third switch 646. A fifth BPF 658 is coupled to the second mixer 612 and the fifth BPF filters 658 a RX signal 621 received by the first antenna 630 to produce a filtered RX signal 623. An LNA 618 amplifies the filtered RX signal 623 to produce an amplified RX signal 625. A fourth switch 654 is coupled to the fourth BPF 652 and a fifth switch 656 is coupled to the second port 604. The LNA 618 and the fifth BPF 658 are disposed along a TX path between the fourth switch 654 and the fifth switch 656 and the power amplifier 614 is disposed along a RX path between the fourth switch 654 and the fifth switch 656. The fourth BPF filter 652 the amplified RX signal 625 to produce a filtered RX signal 627 and the second mixer 612 receives the second amplified LO signal and the filtered RX signal 627 to produce an IF RX signal 629 with the intermediate frequency. The fifth DA 672 amplifies either the first filtered IF RX signal or the second filtered IF RX signal to produce an amplified IF RX signal 631. The first mixer 608 receives the amplified LO signal and the amplified IF RX signal 631 to produce an up-converted TX signal 633 with the RF frequency and the first BPF filters the up-converted TX signal 633 to produce an input RX signal 635 for the third port 616 (receiver port).

In one embodiment, the radio 620 is a WLAN radio that operates at 2.4 GHz for wireless communications using any one of the WLAN protocols, such as 802.11n. The WLAN radio includes a ZIF transceiver that receives a RF signal using channel 6, according to any one of the wireless protocols, such as the 802.11a/b/g/n/ac Wi-Fi® standards. The RF signal may have a center frequency of 2436 MHz. During operation of the RFFE circuitry 600, a RX signal is received at the first antenna 630 from over the air transmission. The RX signal may be passed to an LNA, BPF and switch. A down-converter mixer can down convert the signal to the original intermediate frequency. Similar DA and filter stages are used to feed the LO signal to the mixer similar to the down converter mixer. The IF RX signal is filtered through the switch and IF BPF. The programmable filter circuit may include multiple channel filters with 20 MHz, 40 MHz, and 80 MHz respectively to support different channel bandwidth configurations defined by the standard. The filtered IF Rx signal is passed through a switch to an IF driver amplifier and the IF Rx signal is up converted to the RF frequency through the up-converter mixer. The RF Rx signal is passed to an RF BPF then to a switch to route the signal to the RX path of the radio 620.

In another embodiment, the electronic device further includes a second antenna, a second ZIF transceiver, including a second transmitter port and a second receiver port, and second RFFE circuitry coupled between the second antenna and the second transmitter port and the second receiver port of the second ZIF transceiver. The second RFFE circuitry is a duplicate of the RFFE circuitry described above. For example, the electronic device may include a first radio coupled to a first antenna via first RFFE circuitry and a second radio coupled to a second antenna via second RFFE circuitry, such as illustrated in FIG. 7. The following description describes a bi-directional RFFE radio architecture with multiple channels for concurrent radio operation with high selectivity performance. The embodiments described herein may allow for more than a single-channel radio operation with conventional antenna isolation architectures at the 2.4 GHz band. Other embodiments may allow more than four channels concurrent operation with conventional antennas isolation architecture at the 5 GHz band. The embodiments described herein may increase capacity, for example, proportionally increase data throughput followed by numbers of radios. The embodiments described herein may have lower TXOON as compared to traditional ZIF transceivers without the RFFE circuitry described herein. The embodiments described herein may improve the selectivity (ACI and CCI) on the receiver. The embodiments described herein may support multiple channels M×N MIMO Radio, where M is the number of transmitters on a first device (e.g., at an access point or base station) and N is the number of transmitters on a second device (e.g., client consumption device, STA, or the like), where M and N are positive integers.

FIG. 7 is a block diagram of RFFE circuitry 700 with high selectivity performance in multi-channel operation with multiple radios and multiple antennas according to one embodiment. The RFFE circuitry 700 includes the RFFE circuitry 600 of FIGS. 6A and 6B and further includes N number of duplicate RFFE circuits for each of N radios, where N is a positive integer greater than 1. The depicted embodiment, for simplicity, illustrates one duplicate RFFE circuit 710. The duplicate RFFE circuit 710 is coupled between an Nth radio 720 and an Nth antenna 730. The duplicate RFFE circuit 710 may include the same components as described above with respect to RFFE circuitry 600 as described above with respect to FIGS. 6A and 6B. Similarly, the duplicate RFFE circuit 710 operates in a similar fashion in both the transmit path and receive path as the RFFE circuitry 600.

Figure 8:
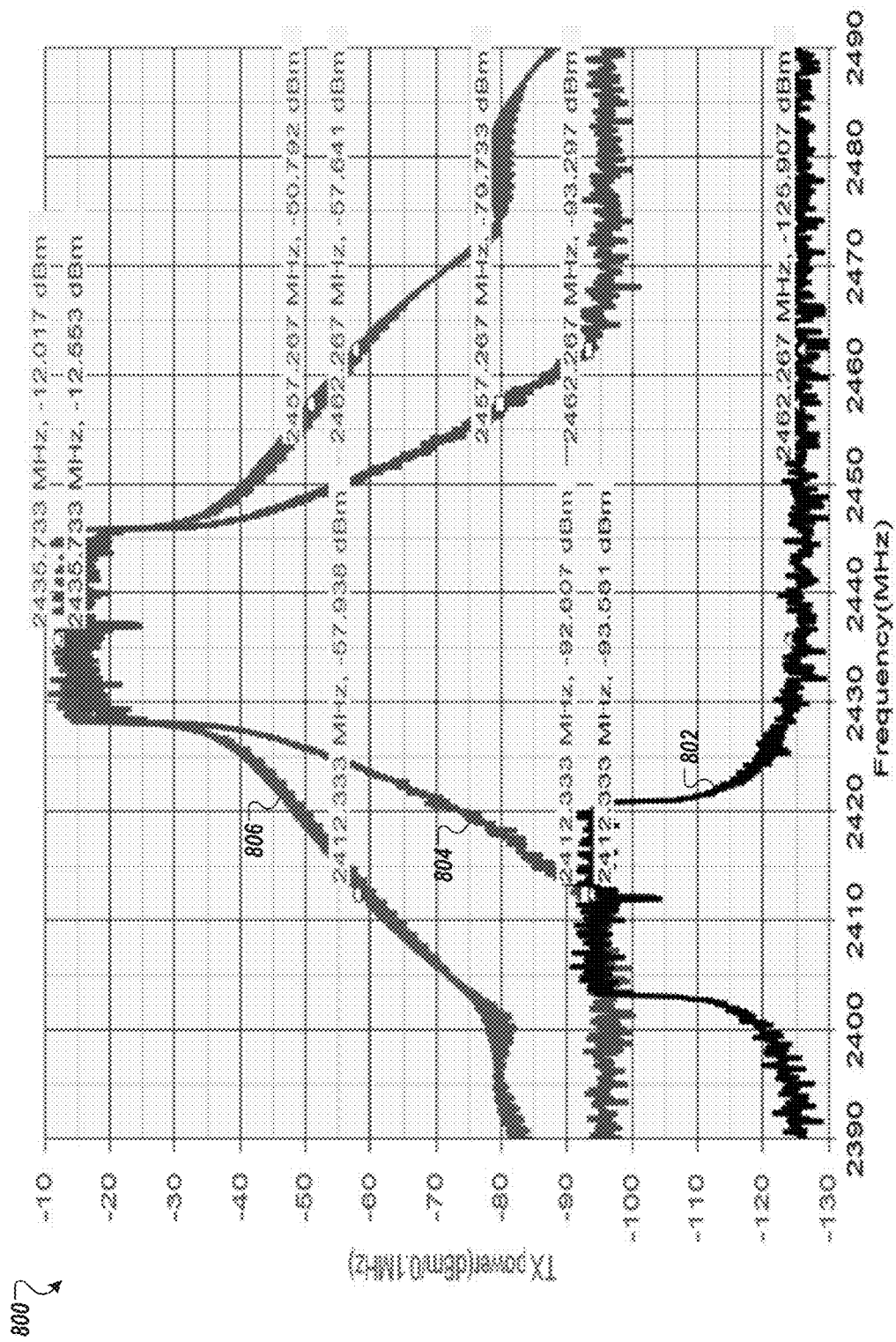
FIG. 8 is a graph showing a transmit out-of-channel noise (TXOON) with RFFE circuitry of FIG. 7 according to one embodiment.

FIG. 8 is a graph 800 showing a transmit out-of-channel noise (TXOON) with RFFE circuitry of FIG. 7 according to one embodiment. The graph 800 shows the RX signal 802, the TXOON 804 when using a ZIF transceiver with the RFFE circuitry 700 of FIG. 7 and the TXOON 806 when using a ZIF transceiver without the RFFE circuitry 700 according to one embodiment. For measuring TXOON, the ZIF transceiver is set to transmit in channel 6 and receive in channel 1 in the 2.4 GHz band for IEEE 802.11n is used with a coding scheme of MCS7 with long guard interval (LGI) for the coding information. This may be the standard setting for IEEE 802.11n (compared to SGI 400 ns). Channel 1 is at 2412 MHz, Channel 6 is at 2437 MHz, Channel 10 is at 2457 MHz, and channel 11 is at 2462 MHz. The channel bandwidth of 20 MHz is selected for the ZIF transceiver. The TXOON is the transmit power by a transmitter of the ZIF transceiver in frequencies outside of the channel selected for receiving the RX signal. In this case, the RX signal 802 is received in Channel 1 at 2412 MHz with a 20 MHz channel bandwidth and a transmitter of the ZIF transceiver is transmitting in Channel 6 at 2437 MHz with a 20 MHz channel bandwidth. As a result of transmitting in Channel 6, there is TXOON that affects the receiving of the RX signal. To permit concurrent operation of transmitting in Channel 6 while receiving in Channel 1, the RFFE circuitry 700 is designed to have an antenna requirement for the receiver that is less than −160 dBm/Hz at both at Channel 1 at 2412 MHz and Channel 11 at 2462 MHz. Thus, the RFFE circuitry 700 can be designed to have a TXOON at the receiver less −140 dBm/Hz with antenna isolation of approximately −30 dBM/Hz. As illustrated in FIG. 8, the TXOON 806 is higher than TXOON 804 at Channel 1 at 2412 MHz and Channel 11 at 2462 MHz. The following table illustrates the TXOON at three other channels of the ZIF transceiver when the ZIF transceiver is transmitting in channel 6 with and without the RFFE circuitry 700.

|  | Without RFFE circuitry 700 | With RFFE circuitry 700 |
| --- | --- | --- |
| TX Power/Channel 6 (2437 MHz) | 10 dBm | 10 dBm |
| TXOON at channel 1 (2412 MHz) | −107.9 dBm/Hz | −142.6 dBm/Hz |
| TXOON at channel 10 (2457 MHz) | −100.8 dBm/Hz | −129.7 dBm/Hz |
| TXOON at channel 11 (2462 MHz) | −10769 dBm/Hz | −143.3 dBm/Hz |

As illustrated in FIG. 8, the TXOON 804 tapers quicker in TX power once outside of the selected channel (e.g., Channel 6) for transmitting than TXOON 806. That is using the RFFE circuitry 700 with the ZIF transceiver reduces the TXOON 804 in the other channels more effectively than a ZIF transceiver without the RFFE circuitry 700.

Figure 9:
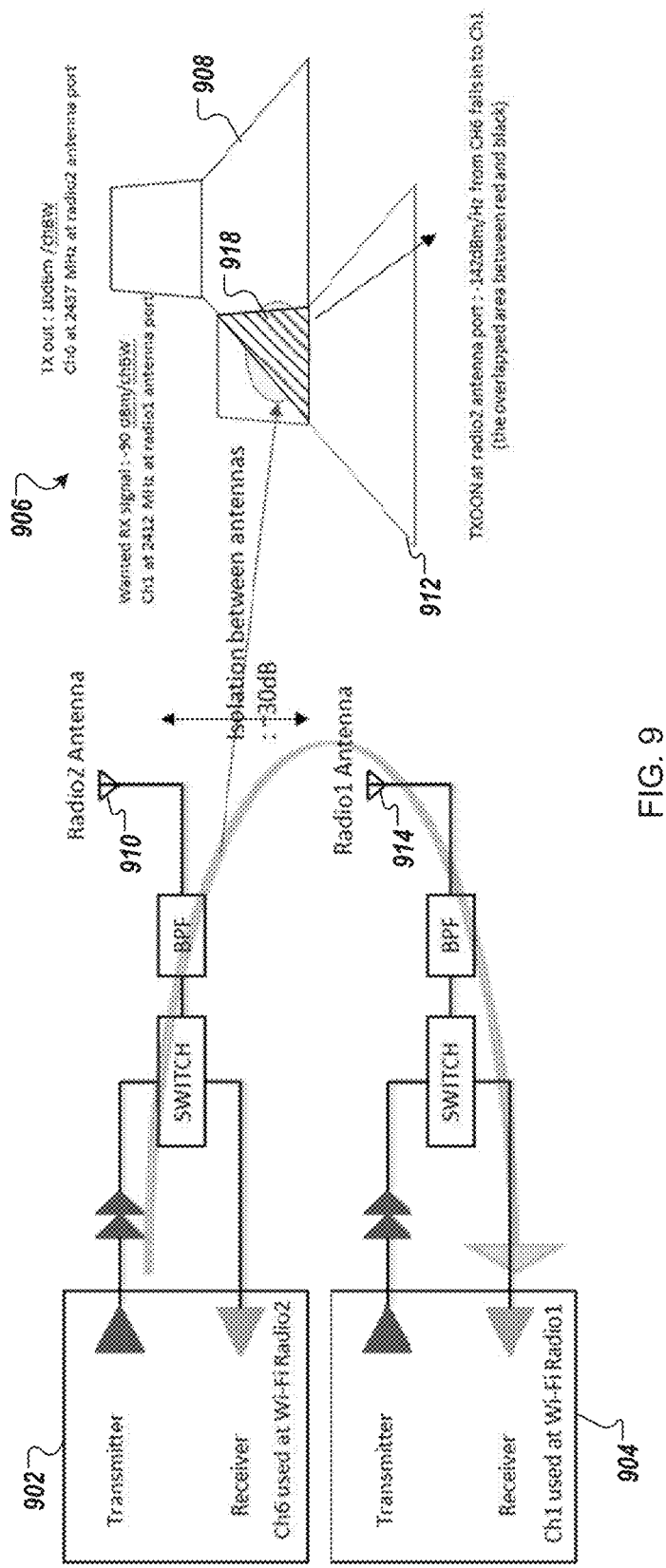
FIG. 9 is a block diagram of two radios that operate in two channels at the same time within a single band two radios in a single band which communicate with two channels at the same time according to one embodiment.

FIG. 9 is a block diagram of two radios that operate in two channels at the same time within a single band according to one embodiment. In this embodiment, a first electronic device, such as a wireless access point (AP), includes a radio 902 with a transmitter that transmits at a first channel (e.g., channel 1 in 2.4 GHz band) and a receiver that receives at channel a second channel (e.g., channel 6 in 2.4 GHz band). A second electronic device, such as a station (STA), includes a radio 904 with a transmitter that transmits in the second channel (e.g., channel 6) and a receiver that receives at the first channel (e.g., channel 1). The two radios of the two devices can operate in a single band (e.g., 2.4 GHz band) and can communicate with two channels (e.g., channel 1 and 6) at the same time in a frequency division duplex (FDD) fashion. FDD is a technique where separate frequency bands are used at the transmitter and receiver so the sending and receiving of signals do not interfere with each other. Given the proximity of the channels in the 2.4 GHz band, the TXOON caused by the transmitter in one channel needs to be reduced for the receiver in the other channel. The embodiments of the RFFE circuitry as described herein reduces the TXOON as illustrated in graph 906 of FIG. 9. The transmitter of radio 902 transmits a TX signal 908, via an antenna 910, and a corresponding RX signal 912 is received by the receiver of radio 904 via antenna 914. For example, the transmit signal may be 10 dBm per the channel bandwidth at channel 6 at 2437 MHz at an antenna port of antenna 910 of radio 902. However, the first device's radio 902 transmission on channel 6 impacts the TXOON on channel 1 bandwidth at the receiver of radio 904 of the second device. The TXOON from channel 6 to channel 1 can cause a de-sense on the receiver. When the radio 902 transmits via the antenna 910, the TX power at channel 6 generates the power spectrum illustrated in FIG. 8 at channel 1. The power generated in channel 1 will be received by the radio 904 at channel 1 via the antenna 914, hence causing a de-sense of the radio 904. This is illustrates in the hashed region 918 of graph 906. To avoid or reduce the de-sense on the receiver, the first device's radio 902 should have TXOON less than an equivalent noise floor on the receiver. In some cases, the target TXOON may be less than −140 dBm/Hz. By adding a 30 dB isolation between the radio 902 and radio 904, the de-sense on the receiver can be further reduced or avoided to achieve less than −160 dBm/Hz for the receiver antenna requirement. For example, as illustrated and described above, using the RFFE circuitry 700, the TXOON at channel 1 can be −142 dBm/Hz. With 30 dBm antenna isolation, the TXOON becomes −172 dBm/Hz at channel 1 at the receiver of radio 904. This permits the first device and the second device to communicate on two channels (e.g., channel 1 and 6) at the same time without de-sense on the receiver.

Figure 10:
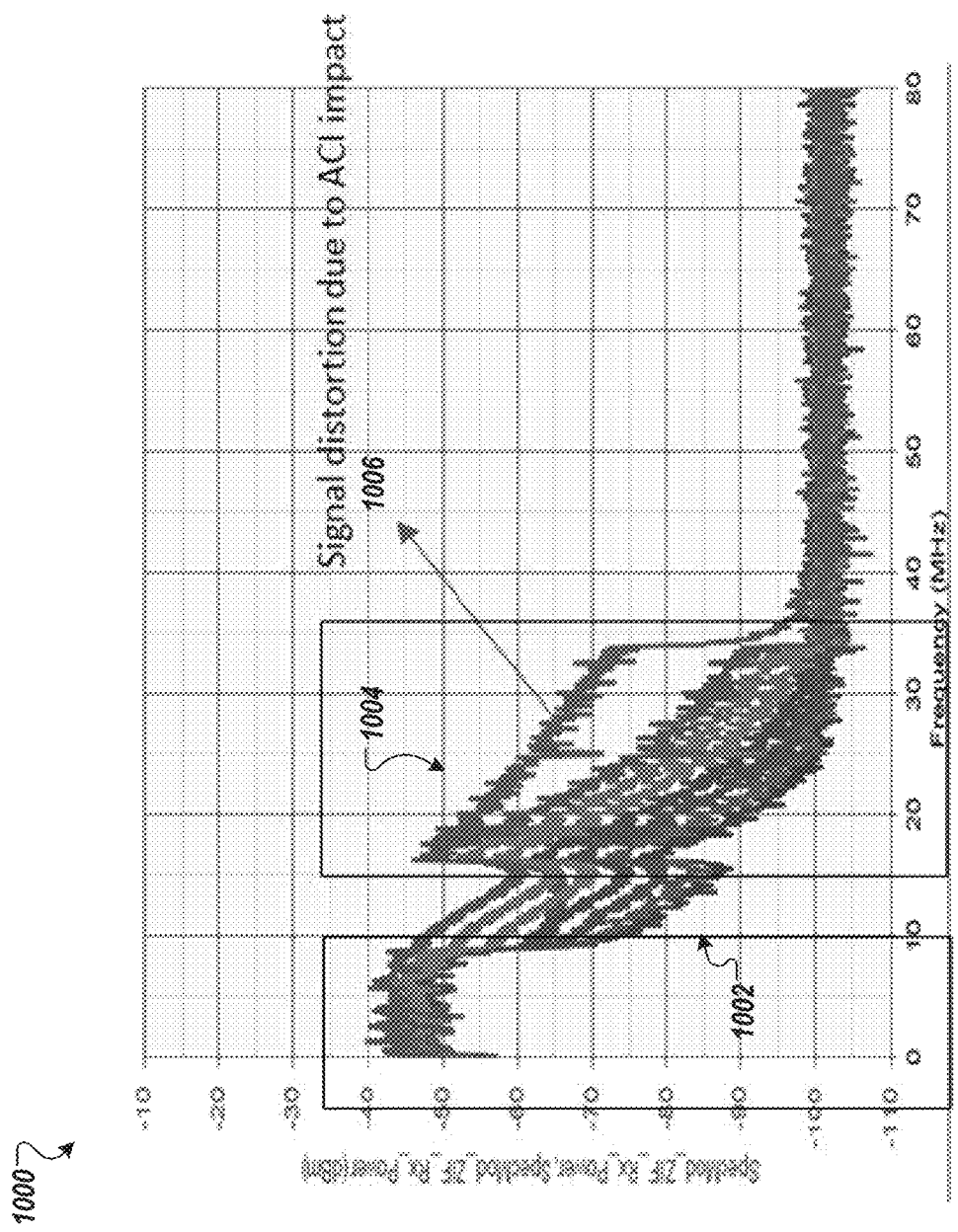
FIG. 10 is a graph showing a baseband spectrum of a zero intermediate frequency (ZIF) transceiver with and without the RFFE circuitry according to one embodiment.

FIG. 10 is a graph 1000 showing a baseband spectrum of the ZIF transceiver with and without the RFFE circuitry according to one embodiment. The graph 1000 shows RX power for RX signals 1002 received when using the RFFE circuitry described herein and RX signals 1004 received when not using the RFFE circuitry described herein. For this simulation, the radios communicate in two channels in the 2.4 GHz band according to IEEE 802.11n with MCS7 with LGI coding information. The channel bandwidth is 20 MHz, the transmitter (aggressor) of the first radio transmits on channel 6 and the receiver (victim) of the second radio receives on channel 1. For the simulation, the aggressor's TX power is swept from −60 dBm/channel bandwidth (chBW) to −10 dBm/chBW. FIG. 10 shows a linearity improvement with −50 dBm/chBW at channel 6 comparing the ZIF transceiver architecture with and without the RFFE circuitry as described herein. As illustrated in FIG. 10, there is signal distortion 1006 in the RX signals caused by adjacent channel interference (ACI). As illustrated in FIG. 10, the signal distortion in the RX signals 1002 is less than the signal distortion in RX signals 1004. There is also a 21 dB improvement on packet error rate at 10 percent when using an architecture with the RFFE circuitry as compared to the architecture without the RFFE circuitry, as illustrated in FIG. 11.

Figure 11:
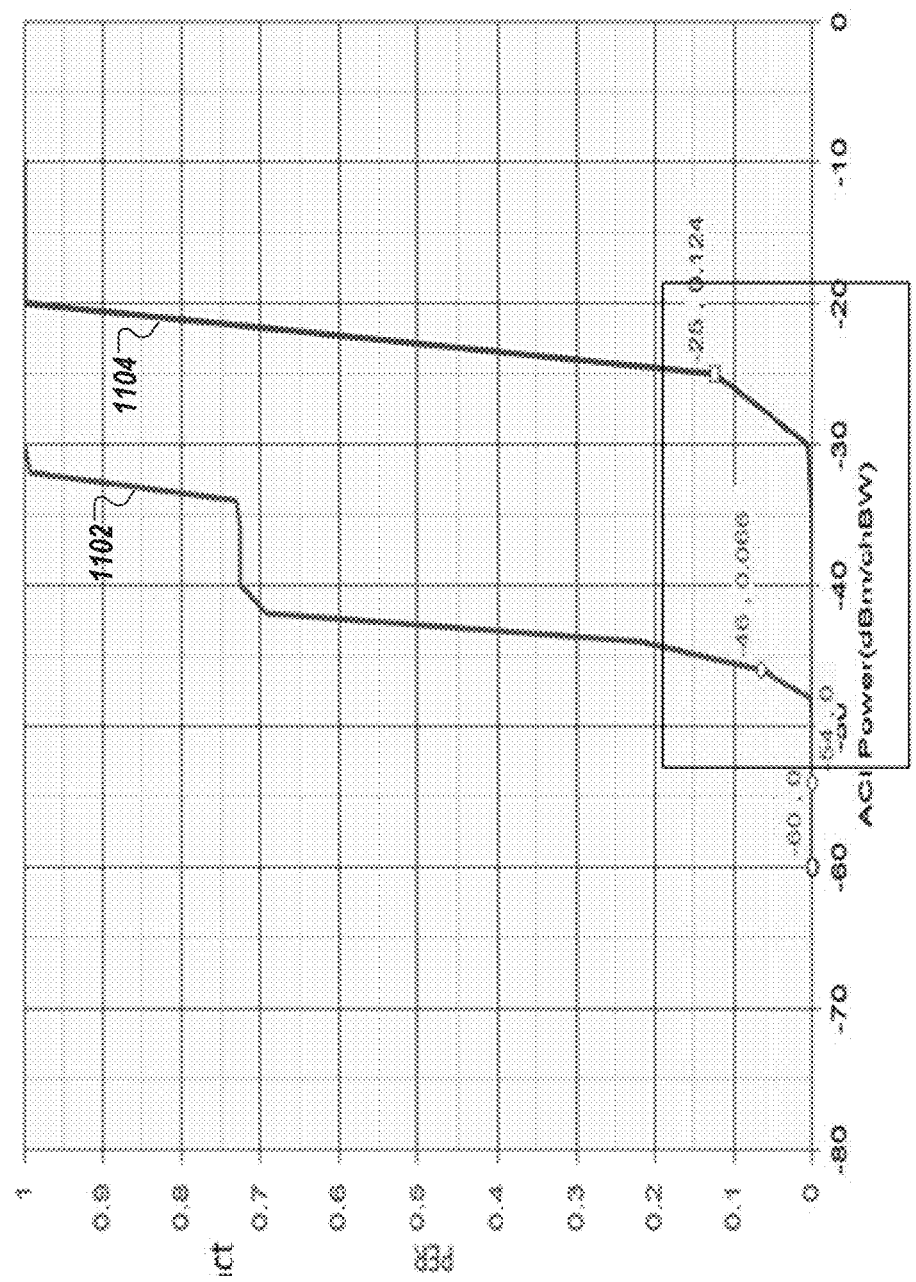
FIG. 11 is a graph 1100 showing packet error rate (PER) as a function of the adjacent channel interference (ACI) power of the ZIF transceiver with and without the RFFE circuitry according to one embodiment.

FIG. 11 is a graph 1100 showing packet error rate (PER) as a function of the ACI power of the ZIF transceiver with and without the RFFE circuitry according to one embodiment. At ten percent, a PER 1102 of an architecture without the RFFE circuitry is approximately −46 dBm in ACI power, whereas a PER 1104 of an architecture with the RFFE circuitry is approximately −25 dBm in ACI power, resulting in an improvement of 21 dBm in PER.

As described above and illustrated with respect to FIG. 9, a de-sense can be caused by TXOON. Similarly, ACI or alternative ACI (AACI) can cause a de-sense at the receiver. The RFFE described herein may also prevent a de-sense from ACI or AACI, as illustrated in FIG. 12.

Figure 12:
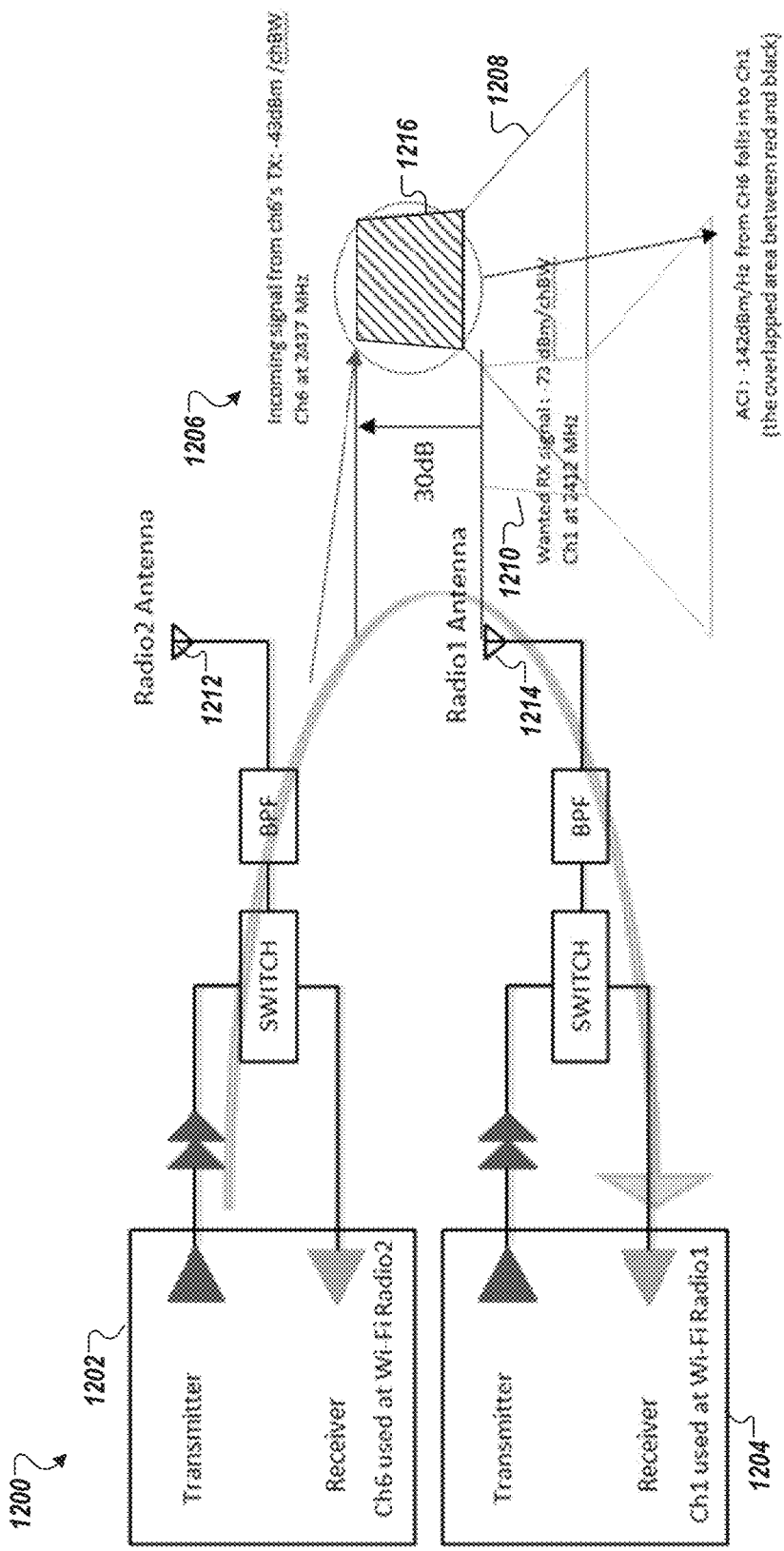
FIG. 12 is a block diagram of two radios that operate in two channels at the same time within a single band according to another embodiment.

FIG. 12 is a block diagram of two radios that operate in two channels at the same time within a single band according to another embodiment. In this embodiment, a first electronic device, such as a wireless access point (AP), includes a radio 1202 with a transmitter that transmits at a first channel (e.g., channel 1 in 2.4 GHz band) and a receiver that receives at channel a second channel (e.g., channel 6 in 2.4 GHz band). A second electronic device, such as a station (STA), includes a radio 1204 with a transmitter that transmits in the second channel (e.g., channel 6) and a receiver that receives at the first channel (e.g., channel 1). The two radios of the two devices can operate in a single band (e.g., 2.4 GHz band) and can communicate with two channels (e.g., channel 1 and 6) at the same time in a FDD fashion. Given the ACI, −142 dBm/Hz from channel 6 falls into channel 1 (the overlapped area between an incoming signal 1208 from channel 6 of radio 1202 and a wanted RX signal 1212), the receiver can be affected by the TX power, causing non-linearity. The embodiments of the RFFE circuitry as described herein reduces the ACI as illustrated in graph 1206 of FIG. 12. The transmitter of radio 1202 transmits a TX signal, via an antenna 1210, and a corresponding RX signal 1212 is received by the receiver of radio 1204 via antenna 1214. More specifically, when the radio 1202 transmits TX power at channel 6 via the antenna 910, the power will be received by radio 1204 at channel 6. The radio 1204 may be impacted by the strong TX power of channel 6, causing non-linearity behavior (TX blocking), as illustrated in the hashed region 1216 of graph 1206. For example, the transmit signal may be 10 dBm per the channel bandwidth at channel 6 at 2437 MHz at an antenna port of antenna 1210 of radio 1202 (e.g., −43 dBm/chBW at channel 6 at 2437 MHz). The TX signal causes non-linearity on the LNA input of the receiver. To avoid or reduce the non-linearity on the receiver caused by the ACI, the first device's radio 902 should have ACI less than an equivalent noise floor on the receiver. By adding a 30 dB isolation between the radio 1202 and radio 1204, the de-sense on the receiver can be further reduced or avoided. This permits the first device and the second device to communicate on two channels (e.g., channel 1 and 6) at the same time without de-sense on the receiver.

FIG. 13 illustrates a multi-radio, multi-channel (MRMC) network device 1300 according to one embodiment. The MRMC network 1300 includes a metal housing 1302 that has eight sectors 1304-1318. Each of the eight sectors 1304-1318 has a truncated pyramid structure with a top portion and four side portions that define a recessed region of the respective truncated pyramid structure. The truncated pyramid structures are disposed on their sides in a horizontal plane and arranged in a circular arraignment with two adjacent sectors sharing at least one common side portion. The truncated pyramid structure may form an octagonal prism for the metal housing 1302. The top portion and the four side portions may be metal surfaces or have portions of metal. Also, the outer top surfaces of the eight sectors form an inner chamber 1311 in a center of the metal housing 1302. In particular, the sector 1308 may be considered a reflective chamber that includes an top portion 1330, a first side portion 1332, a second side portion 1334, a third side portion 1336, and a fourth side portion 1338. The other sectors 1304, 1306, 1310, 1312, 1314, 1316, and 1318 may have similar metal portions or surfaces as reflective chambers as the sector 1308. Similarly, the inner chamber 1311 can be considered reflective. For example, a circuit board may include a metal ground plane that is a reflective surface for the top antenna, as well as for the bottom antenna. The opposite sides of the metal surfaces of the reflective chambers also are reflective for the top and bottom antennas.

In the depicted embodiment, the MRMC network 1300 includes a circuit board 1320 disposed within the metal housing 1302. In particular, the circuit board 1320 may include multiple portions, such as a first portion disposed in the inner chamber 1311. There may be a second portion of the circuit board 1320 disposed within a first sector 1304 and a third portion of the circuit board 1320 disposed within a second sector 1306. These portions may extend to an outer side of the metal housing 1302. The circuit board 1320 may also include smaller portions that are disposed in the other sectors 1308-1318 to accommodate some of the antenna pairs disposed within the respective sectors.

In the depicted embodiment, the MRMC network 1300 includes eight pairs of antennas 1340, each pair being disposed in one of the eight sectors 1304-1318. Each pair includes a horizontal orientation antenna and a vertical orientation antenna. The eight pairs of antennas 1340 may be disposed on, above, or below corresponding sections of the circuit board 1320. In one embodiment, each of the eight pairs of antennas 1340 is a pair of cross polarized dipole antennas, a pair of vertical polarized dipole antennas, or a pair of cross polarized patch antennas.

In some embodiments, the MRMC network 1300 includes a top antenna disposed on a top side of the circuit board 1320 within the inner chamber 1311 and a bottom antenna disposed on a bottom side of the circuit board 1320 within the inner chamber 1311. In the depicted embodiment, top antennas 1342, 1344 are disposed above the circuit board 1320, and bottom antennas 1346, 1348 are disposed below the circuit board 1320. The top antennas 1342, 1344 and the bottom antennas 1346, 1348 are helix coil antennas. In other embodiments, the top and bottom antennas may be other types of antennas, such as patch antennas, monopoles, dipoles, loops, folded monopoles, or the like.

In the depicted embodiment, the eight pairs of antennas 1340, the top antennas 1342, 1344, and the bottom antennas 1346, 1348 are design to radiate electromagnetic energy in a first frequency range, such as the 5 GHz band of the Wi-Fi® technologies. The metal of the top portion and the four side portions of each of the eight sectors operate as a reflector chamber. For example, the metal of the top portion 1330 and the four side portions 1332-1338 of the sector 1308 operate as a reflector chamber for the pair of antennas 1340 within the respective chamber. The reflective chamber reflects the electromagnetic energy, radiated by the horizontal orientation antenna, in a first directional radiation pattern with high gain in a direction along a center axis of the sector 1308 (e.g., a truncated pyramid structure) and reflects the electromagnetic energy, radiated by the vertical orientation antenna, in a second directional radiation pattern with high gain in the direction along the center axis of the sector 1308. The gain the first direction is considered higher than the gain in other directions, such as an opposite direction than the first direction. The number of metal surfaces may impact the gain in the first direction. As few as one metal surface can be used to reflect the electromagnetic energy. However, if more than three metal surfaces, the gain in the first direction can be increased.

In the depicted embodiment, the MRMC network 1300 includes a first omni-directional antenna 1350 (e.g., dual-band WLAN antenna) disposed on the top side of the second portion of the circuit board 1320 disposed within the sector 1304 (i.e., a first of the eight sectors). In a further embodiment, a second omni-directional antenna 1352 is disposed on the top side of the third portion of the circuit board 1320 disposed within the sector 1306 (i.e., a second of the eight sectors). The first omni-directional antenna 1350 and the second omni-directional antenna 1352 are designed to radiate electromagnetic energy in the first frequency range (e.g., 5 GHz band) and a second frequency range (e.g., 2.4 GHz band).

In the depicted embodiment, the MRMC network 1300 includes a first cellular antenna 1354 (e.g., WWAN antenna) disposed on the top side of the second portion of the circuit board 1320 disposed within the sector 1304 (i.e., a first of the eight sectors). In a further embodiment, a second cellular antenna 1356 is disposed on the top side of the third portion of the circuit board 1320 disposed within the sector 1306 (i.e., a second of the eight sectors). The first cellular antenna 1354 and the second cellular antenna 1356 are designed to radiate electromagnetic energy in a third frequency range. For examples, the third frequency range may be the 900 MHz band for the 2G specification, the 1800 MHz band for the 2G specification, the B1 band for the 3G specification, the B8 band for the 3G specification, or the B40 band for the LTE specification.

In the depicted embodiment, the MRMC network 1300 includes a first RF radio (not illustrated in FIG. 13) disposed on the circuit board 1320 and coupled to the first cellular antenna 1354 and the second cellular antenna 1356. The first RF radio causes the first cellular antenna 1354, the second cellular antenna 1356, or both to radiate the electromagnetic energy in the third frequency range. In a further embodiment, multiple RF radios (not illustrated in FIG. 13) are disposed on the circuit board 1320 and coupled to the eight pairs of antennas 1340, the top antennas 1342, 1344, and the bottom antennas 1346, 1348. The RF radios cause different combinations of one or more of the eight pairs of antennas 1340, the top antennas 1342, 1344, and the bottom antennas 1346, 1348 to radiate the electromagnetic energy in the first frequency range (e.g., 2.4 GHz band). In a further embodiment, a second RF radio (not illustrated in FIG. 13) is disposed on the circuit board 1320 and coupled to the first omni-directional antenna 1350 and the second omni-directional antenna 1352. The second RF radio cause the first omni-directional antenna 1350, the second omni-directional antenna 1352, or both to radiate the electromagnetic energy in the first frequency range (e.g., 5 GHz band).

In the depicted embodiment, the MRMC network 1300 includes a third RF radio (not illustrated in FIG. 13) disposed on the circuit board 1320 and coupled to the first omni-directional antenna 1350 and the second omni-directional antenna 1352. The second RF radio cause the first omni-directional antenna 1350, the second omni-directional antenna 1352, or both to radiate the electromagnetic energy in the second frequency range (e.g., 2.4 GHz band).

FIG. 14 is a block diagram of a network hardware device 1400 according to one embodiment. The network hardware device 1400 may correspond to the network hardware device 102-110 of FIG. 1. In another embodiment, the network hardware device 1400 may correspond to the network hardware devices 202-210 in FIG. 2. In another embodiment, the network hardware device 1400 may correspond to the mesh node 300 of FIG. 3. Alternatively, the network hardware device 1400 may be other electronic devices, as described herein.

The network hardware device 1400 includes one or more processor(s) 1430, such as one or more CPUs, microcontrollers, field programmable gate arrays, or other types of processors. The network hardware device 1400 also includes system memory 1406, which may correspond to any combination of volatile and/or non-volatile storage mechanisms. The system memory 1406 stores information that provides operating system component 1408, various program modules 1410, program data 1412, and/or other components. In one embodiment, the system memory 1406 stores instructions of methods to control operation of the network hardware device 1400. The network hardware device 1400 performs functions by using the processor(s) 1430 to execute instructions provided by the system memory 1406.

The network hardware device 1400 also includes a data storage device 1414 that may be composed of one or more types of removable storage and/or one or more types of non-removable storage. The data storage device 1414 includes a computer-readable storage medium 1416 on which is stored one or more sets of instructions embodying any of the methodologies or functions described herein. Instructions for the program modules 1410 may reside, completely or at least partially, within the computer-readable storage medium 1416, system memory 1406 and/or within the processor(s) 1430 during execution thereof by the network hardware device 1400, the system memory 1406 and the processor(s) 1430 also constituting computer-readable media. The network hardware device 1400 may also include one or more input devices 1418 (keyboard, mouse device, specialized selection keys, etc.) and one or more output devices 1420 (displays, printers, audio output mechanisms, etc.).

The network hardware device 1400 further includes a modem 1422 to allow the network hardware device 1400 to communicate via a wireless connections (e.g., such as provided by the wireless communication system) with other computing devices, such as remote computers, an item providing system, and so forth. The modem 1422 can be connected to one or more RF modules 1486. The RF modules 1486 may be a WLAN module, a WAN module, PAN module, GPS module, or the like. The antenna structures (antenna(s) 1484, 1485, 1487) are coupled to the RF circuitry 1483, which is coupled to the modem 1422. The RF circuitry 1483 may include radio front-end circuitry, antenna switching circuitry, impedance matching circuitry, or the like. In one embodiment, the RF circuitry 1483 includes the RFFE circuitry with high selectivity performance as described in the various embodiments of FIGS. 5-12. The antennas 1484 may be GPS antennas, NFC antennas, other WAN antennas, WLAN or PAN antennas, or the like. The modem 1422 allows the network hardware device 1400 to handle both voice and non-voice communications (such as communications for text messages, multimedia messages, media downloads, web browsing, etc.) with a wireless communication system. The modem 1422 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1422 may generate signals and send these signals to antenna(s) 1484 of a first type (e.g., WLAN 5 GHz), antenna(s) 1485 of a second type (e.g., WLAN 2.4 GHz), and/or antenna(s) 1487 of a third type (e.g., WAN), via RF circuitry 1483, and RF module(s) 1486 as descried herein. Antennas 1484, 1485, 1487 may be configured to transmit in different frequency bands and/or using different wireless communication protocols. The antennas 1484, 1485, 1487 may be directional, omnidirectional, or non-directional antennas. In addition to sending data, antennas 1484, 1485, 1487 may also receive data, which is sent to appropriate RF modules connected to the antennas. One of the antennas 1484, 1485, 1487 may be any combination of the antenna structures described herein.

In one embodiment, the network hardware device 1400 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1422 is shown to control transmission and reception via antenna (1484, 1485, 1487), the network hardware device 1400 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A radio frequency front-end (RFFE) circuit comprising:
    a first port configured to couple to a transmitter;
    a second port configured to couple to an antenna;
    a local oscillator (LO) circuit configured to generate a LO signal;
    a first mixer coupled to the LO circuit and the first port, wherein the first mixer is configured to produce a first intermediate frequency (IF) signal;
    a programmable filter circuit coupled to the first mixer, wherein the programmable filter circuit is configured to filter the first IF signal based on a first channel bandwidth of a plurality of channel bandwidths to produce a channel-filtered IF signal corresponding to the first channel bandwidth;
    a second mixer coupled to the LO circuit and the programmable filter circuit;
    a power amplifier coupled to the second mixer;
    a third port configured to couple to a receiver; and
    a low-noise amplifier (LNA) coupled to the second port, wherein the LNA is configured to produce a filtered RX signal, wherein:
        the second mixer is further coupled to the LNA;
        the second mixer is configured to produce a IF signal;
        the IF signal has a first frequency that is lower than a second frequency of the filtered RX signal;
        the programmable filter circuit is configured to filter the IF signal based on a second channel bandwidth of the plurality of channel bandwidths to produce a channel-filtered IF signal corresponding to the second channel bandwidth; and
        the first mixer is further configured to receive the LO signal and the channel-filtered IF signal to produce an input RX signal having the second frequency.

2. The RFFE circuit of claim 1, wherein the first port is coupled to a first port of a radio and the third port is coupled to a second port of the radio, wherein the radio comprises the transmitter and the receiver, wherein the RFFE circuit is a first integrated circuit, and wherein the radio is a second integrated circuit that is different than the first integrated circuit.

3. The RFFE circuit of claim 1, wherein the first port is coupled to the transmitter of a first radio, wherein the RFFE further comprises:
    a fourth port configured to couple to a second receiver of a second radio;
    a fifth port configured to couple to a second antenna;
    a second LO circuit configured to generate a second LO signal;
    a third mixer coupled to the second LO circuit;
    a second programmable filter circuit coupled to the third mixer;
    a fourth mixer coupled to the second LO circuit and the second programmable filter circuit;
    a second LNA coupled to the fifth port, wherein the second LNA is configured to produce a second filtered RX signal, wherein:
        the fourth mixer is further coupled to the second LNA;
        the fourth mixer is further configured to receive the second LO signal and the second filtered RX signal and produce a third IF signal;
        the third IF signal has a third frequency that is lower than a fourth frequency of the second filtered RX signal;
        the second programmable filter circuit is configured to filter the second IF signal based on a second channel bandwidth of the plurality of channel bandwidths to produce a second channel-filtered IF signal corresponding to the second channel bandwidth; and
        the third mixer is further configured to receive the second LO signal and the second channel-filtered IF signal to produce a second input RX signal having the fourth frequency.

4. The RFFE circuit of claim 3, wherein the first radio comprises the transmitter and the receiver and the second radio comprises the second receiver, wherein the RFFE circuit is a first integrated circuit, wherein the first radio is a second integrated circuit that is different than the first integrated circuit, and wherein the second radio is a third integrated circuit that is different than the first integrated circuit.

5. A radio frequency front-end (RFFE) circuit comprising:
    a first port configured to couple to a transmitter;
    a second port configured to couple to an antenna;
    a local oscillator (LO) circuit configured to generate a LO signal;
    a first mixer coupled to the LO circuit and the first port, wherein the first mixer is configured to produce a first intermediate frequency (IF) signal;
    a programmable filter circuit coupled to the first mixer, wherein the programmable filter circuit is configured to filter the first IF signal based on a first channel bandwidth of a plurality of channel bandwidths to produce a channel-filtered IF signal corresponding to the first channel bandwidth;

a second mixer coupled to the LO circuit and the programmable filter circuit, wherein the second mixer is configured to produce a filtered TX signal;

a power amplifier coupled to the second mixer, wherein the first port is coupled to the transmitter of a first radio, wherein the RFFE further comprises:

a third port configured to couple to a second transmitter of a second radio;

a fourth port configured to couple to a second antenna;

a second LO circuit configured to generate a second LO signal;

a third mixer coupled to the second LO circuit and the fourth port, wherein the third mixer is configured to produce a second IF signal;

a second programmable filter circuit coupled to the third mixer, wherein the second programmable filter circuit is configured to filter the second IF signal based on a second channel bandwidth of the plurality of channel bandwidths to produce a second channel-filtered IF signal corresponding to the second channel bandwidth;

a fourth mixer coupled to the second LO circuit and the second programmable filter circuit, wherein the fourth mixer is configured to produce a second filtered TX signal; and a second power amplifier coupled to the fourth mixer.

6. The RFFE circuit of claim 5, wherein the first radio comprises the transmitter and the second radio comprises the second transmitter, wherein the RFFE circuit is a first integrated circuit, wherein the first radio is a second integrated circuit that is different than the first integrated circuit, and wherein the second radio is a third integrated circuit that is different than the first integrated circuit.

7. The RFFE circuit of claim 1, wherein the programmable filter circuit comprises:

a first multi-port switch coupled to the first mixer;
a second multi-port switch coupled to the second mixer;
a first channel band pass filter (BPF) disposed along a first channel path between the first multi-port switch and the second multi-port switch, wherein the first channel BPF is configured to filter the first IF signal based on a first channel bandwidth of the plurality of channel bandwidths to produce the channel-filtered IF signal corresponding to the first channel bandwidth; and
a second channel BPF disposed along a second channel path between the second multi-port switch and the second multi-port switch, wherein the second channel BPF is configured to filter the first IF signal based on a second channel bandwidth of the plurality of channel bandwidths to produce the channel-filtered IF signal corresponding to the second channel bandwidth.

8. The RFFE circuit of claim 7, wherein the programmable filter circuit comprises a third channel BPF disposed along a third channel path between the first multi-port switch and the second multi-port switch, wherein the third channel BPF is configured to filter the first IF signal based on a third channel bandwidth of the plurality of channel bandwidths to produce the channel-filtered IF signal corresponding to the third channel bandwidth.

9. The RFFE circuit of claim 1, further comprising:
a first driver amplifier (DA) coupled to the first port;
a first BPF coupled to the first DA and the first mixer;
a second BPF coupled to the LO circuit;

a second DA coupled to the second BPF and the first mixer;
a third DA coupled to the first mixer;
a third BPF coupled to the LO circuit;
a fourth DA coupled to the third BPF and the second mixer; and
a fourth BPF coupled to the second mixer and the power amplifier.

10. The RFFE circuit of claim 9, wherein the programmable filter circuit comprises:

a first multi-port switch coupled to the third DA;
a second multi-port switch coupled to the second mixer,
a first channel band pass filter (BPF) disposed along a first channel path between the first multi-port switch and the second multi-port switch;
a second channel BPF disposed along a second channel path between the second multi-port switch and the second multi-port switch; and
a third channel BPF disposed along a third channel path between the first multi-port switch and the second multi-port switch.

11. The RFFE circuit of claim 9, further comprising:
a first switch coupled to the first port, the third port, and the first BPF, wherein the first DA is coupled between the first port and the first switch;
a fifth DA;
a second switch coupled to the first mixer;
a third switch coupled to the programmable filter circuit, wherein the third DA is disposed along a TX path between the second switch and the third switch, and wherein the fifth DA is disposed along a RX path between the second switch and the third switch;
a fifth BPF coupled to the second mixer;
a low-noise amplifier (LNA);
a fourth switch coupled to the fourth BPF; and
a fifth switch coupled to the second port, wherein the LNA and the fifth BPF are disposed along a TX path between the fourth switch and the fifth switch, and wherein the power amplifier is disposed along a RX path between the fourth switch and the fifth switch.

12. An electronic device comprising:
a zero intermediate frequency (ZIF) transmitter; and
radio frequency front-end (RFFE) circuitry coupled to the ZIF transmitter, wherein the RFFE circuitry comprises:
a first port coupled to the transmitter;
a second port coupled to a first antenna;
a local oscillator (LO) circuit configured to generate a LO signal;
a first mixer coupled to the LO circuit and the first port, wherein the first mixer is configured to produce a first intermediate frequency (IF) signal;
a programmable filter circuit coupled to the first mixer, wherein the programmable filter circuit is configured to filter the first IF signal based on a first channel bandwidth of a plurality of channel bandwidths to produce a channel-filtered IF signal corresponding to the first channel bandwidth;
a second mixer coupled to the LO circuit and the programmable filter circuit, wherein the second mixer is configured to produce a filtered transmit (TX) signal; and
a power amplifier coupled to the second mixer and the second port;
a ZIF receiver; and
second RFFE circuitry comprising:
a third port configured to couple to the ZIF receiver;
a fourth port configured to couple to a second antenna;

a second local oscillator (LO) circuit configured to generate a second LO signal;
a low noise amplifier (LNA) coupled to the fourth port, wherein the LNA is configured to produce a filtered RX signal;
a third mixer coupled to the second LO circuit and the LNA;
a second programmable filter circuit coupled to the third mixer, wherein the second programmable filter circuit is configured to filter the second IF signal based on a second channel bandwidth of the plurality of channel bandwidths to produce a second channel-filtered IF signal corresponding to the second channel bandwidth; and
a fourth mixer coupled to the second LO circuit and the second programmable filter circuit.

13. The electronic device of claim 12, further comprising a radio comprising the ZIF receiver and the ZIF transmitter.

14. The electronic device of claim 12, further comprising a first radio comprising the ZIF transmitter and a second radio comprising the ZIF receiver.

15. A mesh network device comprising:
a processing device;
a first antenna;
a first radio coupled to the processing device, the first radio comprising a first transmitter and a first receiver; and
first circuitry coupled between the first radio and the first antenna and coupled to the processing device, wherein the first circuitry comprises:
a first port coupled to the first transmitter;
a second port coupled to the first antenna;
a local oscillator (LO) circuit configured to generate a LO signal;
a first mixer coupled to the LO circuit and the first port, wherein the first mixer is configured to produce a down-converted TX signal;
a programmable filter circuit coupled to the first mixer, wherein the programmable filter circuit, in response to a selection signal received from the processing device, is configured to filter the down-converted TX signal according to a selected channel bandwidth of a plurality of channel bandwidths to produce a channel-filtered TX signal corresponding to the selected channel bandwidth;
a second mixer coupled to the LO circuit and the programmable filter circuit, wherein the second mixer is configured to produce an up-converted TX signal; and
a power amplifier coupled to the second mixer, wherein the first circuitry further comprises:
a third port coupled to the first receiver; and
a low-noise amplifier (LNA) coupled to the second port, wherein
the LNA is configured to produce a filtered RX signal, wherein:
the second mixer is further coupled to the LNA;
the second mixer is further configured to produce a down-converted RX signal;
the programmable filter circuit, in response to a second selection signal, is configured to filter the down-converted RX signal according to a second selected channel bandwidth of the plurality of channel bandwidths to produce a channel-filtered RX signal corresponding to the second selected channel bandwidth; and
the first mixer is further configured to produce an up-converted RX signal.

16. The mesh network device of claim 15, further comprising:
a second antenna;
a second radio coupled to the processing device, the second radio comprising a second transmitter and a second receiver; and
second circuitry coupled between the second radio and the second antenna and coupled to the processing device, wherein the second circuitry comprises:
a fourth port coupled to the second transmitter;
a fifth port coupled to the second antenna;
a second LO circuit configured to generate a second LO signal;
a third mixer coupled to the second LO circuit and the fourth port, wherein the third mixer is configured to produce a second down-converted TX signal;
a second programmable filter circuit coupled to the third mixer, wherein the second programmable filter circuit, in response to a third selection signal received from the processing device, is configured to filter the second down-converted TX signal according to a third selected channel bandwidth of the plurality of channel bandwidths to produce a second channel-filtered TX signal corresponding to the third selected channel bandwidth;
a fourth mixer coupled to the second LO circuit and the second programmable filter circuit, wherein the fourth mixer is configured to produce a second up-converted TX signal; and
a second power amplifier coupled to the fourth mixer.

17. The mesh network device of claim 16, wherein the second circuitry further comprises:
a sixth port coupled to the second receiver; and
a second LNA coupled to the fifth port, wherein the second LNA is configured to produce a second filtered RX signal, wherein:
the fourth mixer is further coupled to the second LNA;
the fourth mixer is further configured to produce a second down-converted RX signal;
the second programmable filter circuit, in response to a fourth selection signal, is configured to filter the second down-converted RX signal according to a fourth selected channel bandwidth of the plurality of channel bandwidths to produce a second channel-filtered RX signal corresponding to the fourth selected channel bandwidth; and
the third mixer is further configured to produce a second up-converted RX signal.

* * * * *